(12) United States Patent
Hart

(10) Patent No.: US 10,530,851 B1
(45) Date of Patent: Jan. 7, 2020

(54) DISTRIBUTED DATA CENTER

(71) Applicant: Vivint, Inc., Provo, UT (US)

(72) Inventor: Michael John Hart, San Jose, CA (US)

(73) Assignee: Vivint, Inc., Provo, UT (US)

(*) Notice: Subject to any disclaimer, the term of this patent is extended or adjusted under 35 U.S.C. 154(b) by 149 days.

(21) Appl. No.: 15/884,380

(22) Filed: Jan. 31, 2018

(51) Int. Cl.
| | |
|---|---|
| G06F 15/173 | (2006.01) |
| H04L 29/08 | (2006.01) |
| H04W 28/08 | (2009.01) |
| G06F 9/50 | (2006.01) |
| H04W 84/18 | (2009.01) |
| H04L 12/931 | (2013.01) |

(52) U.S. Cl.
CPC .......... H04L 67/1012 (2013.01); G06F 9/505 (2013.01); H04W 28/085 (2013.01); H04L 49/70 (2013.01); H04W 84/18 (2013.01)

(58) Field of Classification Search
CPC ... H04L 67/1012; G06F 9/505; H04W 28/085
USPC ................................ 709/226, 251, 243, 208
See application file for complete search history.

(56) References Cited

U.S. PATENT DOCUMENTS

| | | | |
|---|---|---|---|
| 9,130,939 B2 | 9/2015 | Vicente et al. | |
| 2008/0162697 A1* | 7/2008 | Griffin | G06F 9/5044 |
| | | | 709/226 |
| 2009/0325608 A1* | 12/2009 | Cheng | H04W 68/12 |
| | | | 455/458 |
| 2012/0240062 A1 | 9/2012 | Passmore | |
| 2012/0311614 A1 | 12/2012 | Deanna et al. | |
| 2014/0222941 A1* | 8/2014 | Tabone | H04W 4/023 |
| | | | 709/208 |
| 2014/0317167 A1 | 10/2014 | Wahl et al. | |
| 2016/0080477 A1 | 3/2016 | Nedeltchev et al. | |
| 2016/0100449 A1* | 4/2016 | Jang | H04W 76/16 |
| | | | 370/252 |
| 2017/0099463 A1* | 4/2017 | Trani | H04N 7/181 |
| 2017/0180439 A1* | 6/2017 | Van Bogaert | H04L 67/2847 |
| 2018/0167841 A1* | 6/2018 | Leicht | H04W 28/0268 |

* cited by examiner

*Primary Examiner* — Liang Che A Wang
*Assistant Examiner* — Kaylee J Huang
(74) *Attorney, Agent, or Firm* — Holland & Hart LLP

(57) ABSTRACT

Techniques are described for wireless communication. One method includes receiving, at a first node of a mesh network from a second node, a request for data associated with a security and automation system; determining, at the first node, that a third node associated with a plurality of neighboring nodes within the mesh network has an available computing resources level to process the data based on configuration information of the mesh network; and transmitting, from the first node to the third node, a message instructing the third node to process the data.

18 Claims, 14 Drawing Sheets

DISTRIBUTED DATA CENTER

BACKGROUND

The following relates generally to wireless communication, and more specifically to distributed data center.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). An AP and one or more STAs may be part of a mainframe-based system or a centralized cloud-based system, or both.

Mainframe-based systems have evolved to centralized cloud-based systems. The mainframe-based system deployment utilized a centralized process for performing processes (e.g., computation and storage operations) within a local area enterprise network. The mainframe-based system, however, required STAs to be located and connected within the local area enterprise network. Centralized cloud-based systems allow STAs (e.g., web browser-based applications) to communicate with centralized public or private cloud-located resources without being limited to a local connection in the local area enterprise network. Nevertheless, cloud-based systems also have other disadvantages, including when information is used by applications and services generated, processed, and consumed in a same locality, the system overhead of transmitting the information to the cloud, storing it, and then re-transmitting it to an end-STA introduces undesirable latency in the system, among other disadvantages.

SUMMARY

The described techniques relate to improved methods, systems, devices, or apparatuses that support a distributed data center. The distributed data center may be referred to as a distributed or decentralized cloud-based system with a mesh network. That is, the distributed or decentralized cloud-based system may utilize a mesh network. In some cases, resources may be distributed across the system, such as compute and storage (e.g., central processing units (CPUs), graphic processing units (GPUs), memory, or any combination thereof) that may be located at an edge of the mesh network. For example, the distributed resources may be located at an end-user's premise or within a regional data center that may be a distance from but close to the end-user's premise.

The system, in some cases, may be interconnected by a dynamic software defined mesh network. In this case, the system using a mesh network configuration may provide lower cost per resources (i.e., computing resources) or may also provide and support gigabyte (GB) capability by leveraging an end-user's premise as a location for the computing, storing, and networking. Additionally, by having a mesh network configuration, the system may result in efficient use of resources by avoiding unnecessary long range transmission of content that would otherwise occur using other systems; unless it is to be consumed somewhere remote from the point of generation. By having storage and compute proximate to the point of consumption, this enables a lower latency experience for the customer and improves performance and other operating parameters.

A method for wireless communication is described. The method may include receiving, at a first node of a mesh network from a second node, a request for data associated with a security and automation system; determining, at the first node, that a third node associated with a plurality of neighboring nodes within the mesh network has an available computing resources level to process the data based at least in part on configuration information of the mesh network; and transmitting, from the first node to the third node, a message instructing the third node to process the data.

An apparatus for wireless communication is described. The apparatus may include means for receiving, from a second apparatus, a request for data associated with a security and automation system; means for determining that a third apparatus associated with a plurality of neighboring apparatuses within the mesh network has an available computing resources level to process the data based at least in part on configuration information of the mesh network; and means for transmitting a message instructing the third apparatus to process the data.

Another apparatus for wireless communication is described. The apparatus may include a processor, memory in electronic communication with the processor, and instructions stored in the memory. The instructions may be operable to cause the processor to receive, at the apparatus of a mesh network from a second apparatus, a request for data associated with a security and automation system; determine, at the apparatus, that a third apparatus associated with a plurality of neighboring apparatuses within the mesh network has an available computing resources level to process the data based at least in part on configuration information of the mesh network; and transmit, from the apparatus to the third apparatus, a message instructing the third apparatus to process the data.

A non-transitory computer readable medium for wireless communication is described. The non-transitory computer-readable medium may include instructions operable to cause a processor to receive, at a first node of a mesh network from a second node, a request for data associated with a security and automation system; determine, at the first node, that a third node associated with a plurality of neighboring nodes within the mesh network has an available computing resources level to process the data based at least in part on configuration information of the mesh network; and transmit, from the first node to the third node, a message instructing the third node to process the data.

Some examples of the method, apparatus, and non-transitory computer-readable medium described above may further include processes, features, means, or instructions for determining, at the first node, that the third node is within a threshold distance of the second node based at least in part on the configuration information. In some examples of the method, apparatus, and non-transitory computer-readable medium described above, transmitting the message is based at least in part on determining that the third node is within the threshold distance.

In some examples of the method, apparatus, and non-transitory computer-readable medium described above, the configuration information comprises at least one of a mesh network identifier (ID), a mesh network topology, a mesh neighbor list, resource information, or a combination thereof.

In some examples of the method, apparatus, and non-transitory computer-readable medium described above, the resource information comprises a computing resource availability, a storage resource availability, or both.

Some examples of the method, apparatus, and non-transitory computer-readable medium described above may further include processes, features, means, or instructions for determining, at the first node, a source address associated with the requested data based at least in part on the received request; and determining, at the first node, that the third node is associated with the source address based at least in part on the configuration information. In some examples of the method, apparatus, and non-transitory computer-readable medium described above, transmitting the message to the third node is further based at least in part on determining that the third node is associated with the source address.

Some examples of the method, apparatus, and non-transitory computer-readable medium described above may further include processes, features, means, or instructions for determining, at the first node, a source address associated with the requested data based at least in part on the received request; determining, at the first node, that the first node is associated with the source address based at least in part on the configuration information; and determining, at the first node, that the available computing resources level of the first node is less than a computing resources level required to process the data. In some examples of the method, apparatus, and non-transitory computer-readable medium described above, transmitting the message instructing the third node to process the data is further based at least in part on the available computing resources level of the first node being less than the computing resources level required to process the data.

Some examples of the method, apparatus, and non-transitory computer-readable medium described above may further include processes, features, means, or instructions for determining, at the first node, that the available computing resources level of the first node is less than a computing resources level required to process the data; broadcasting, by the first node, a beacon frame or a probe request frame to the plurality of neighboring nodes within the mesh network; receiving, at the first node, a beacon response frame or a probe response frame from one or more neighboring nodes of the plurality of neighboring nodes in the mesh network; and determining, at the first node, a geolocation and available computing resources level of the one or more neighboring nodes based at least in part on the received beacon response frame or the received probe response frame.

Some examples of the method, apparatus, and non-transitory computer-readable medium described above may further include processes, features, means, or instructions for determining, at the first node, that the one or more neighboring nodes comprises the third node and a fourth node of the plurality of neighboring nodes have available computing resource to process the data; determining that the third node is within a first distance from the second node based at least in part on the geolocation; determining that the fourth node is within a second distance from the second node based at least in part on the geolocation; and determining that the first distance is smaller than the second distance, wherein transmitting, from the first node to the third node. In some examples of the method, apparatus, and non-transitory computer-readable medium described above, transmitting, from the first node to the third node, the message is further based at least in part on determining that the first distance is smaller than the second distance.

Some examples of the method, apparatus, and non-transitory computer-readable medium described above may further include processes, features, means, or instructions for determining, at the first node, that the determined available computing resources level of the one or more neighboring nodes of the plurality of neighboring nodes in the mesh network do not satisfy the computing resources level required to process the data; receiving, at the first node from a fifth node, the processed data based at least in part on determining that the identified available computing resources level of the one or more neighboring nodes do not satisfy the computing resources level required to process the data; and forwarding the processed data from the first node to the third node for transmitting to the second node.

In some examples of the method, apparatus, and non-transitory computer-readable medium described above, the fifth node is a node in a second mesh network different from the mesh network.

Some examples of the method, apparatus, and non-transitory computer-readable medium described above may further include processes, features, means, or instructions for determining routing information based at least in part on the configuration information; and encoding the routing information with a portion of the message.

In some examples of the method, apparatus, and non-transitory computer-readable medium described above, receiving the request for data from the second node is based at least in part on a first radio access technology (RAT) connection established between the first node and the second node.

In some examples of the method, apparatus, and non-transitory computer-readable medium described above, transmitting the message is based at least in part on a second RAT connection established between the first node and the third node.

DETAILED DESCRIPTION

In some cases, mainframe-based systems utilize a centralized process for performing processes within a local area enterprise network. STAs in the mainframe-based system may have limited connectivity or networking between different enterprise systems. STA performance may be improved by having discrete handling capability to perform the processes (e.g., computing and storing operations) individually; rather than having the processes performed by other enterprise devices in the enterprise network. That is, operations previously performed by a centralized enterprise device may now be distributed to individual STAs and other components. However, the mainframe-based system requires STAs to be located and connected within the local area enterprise network.

Centralized cloud-based systems allow STAs to communicate with centralized public or private cloud-located resources without being limited to a local connection in the local area enterprise network. As such, STAs operating in the cloud-based system have been enabled to access applications, services, and data regardless of location. Cloud-based systems also provide other advantages over mainframe-based systems, such as cost of processing, storing, and accessibility to applications, services and content. The cloud-based systems, however, have disadvantages such as reduced efficiency and increased latency for communication in the system in certain cases.

For example, a home video camera of a security and automation system that captures images and video may upload the captured content to a centralized cloud storage that may be located remote from the security and automation system. The stored content (e.g., captured images, video) may be accessed by an individual at home. In this case, the request to initiate certain actions or operations (e.g., find all captured images in a certain time period) may be sent to the centralized cloud. The computing resources may process the request and return the result (i.e., captured images of interest) to the individual. In this example, the operations performed between a STA and the centralized cloud may be inefficient in that it unnecessarily requires networking resources to transmit and receive content to and from a remote location (i.e., the centralized cloud). The operations performed between the STA and the centralized cloud may be improved by distributing the storage and computing resources closer to where the content generation, processing, and consumption occurs.

Figure 1:
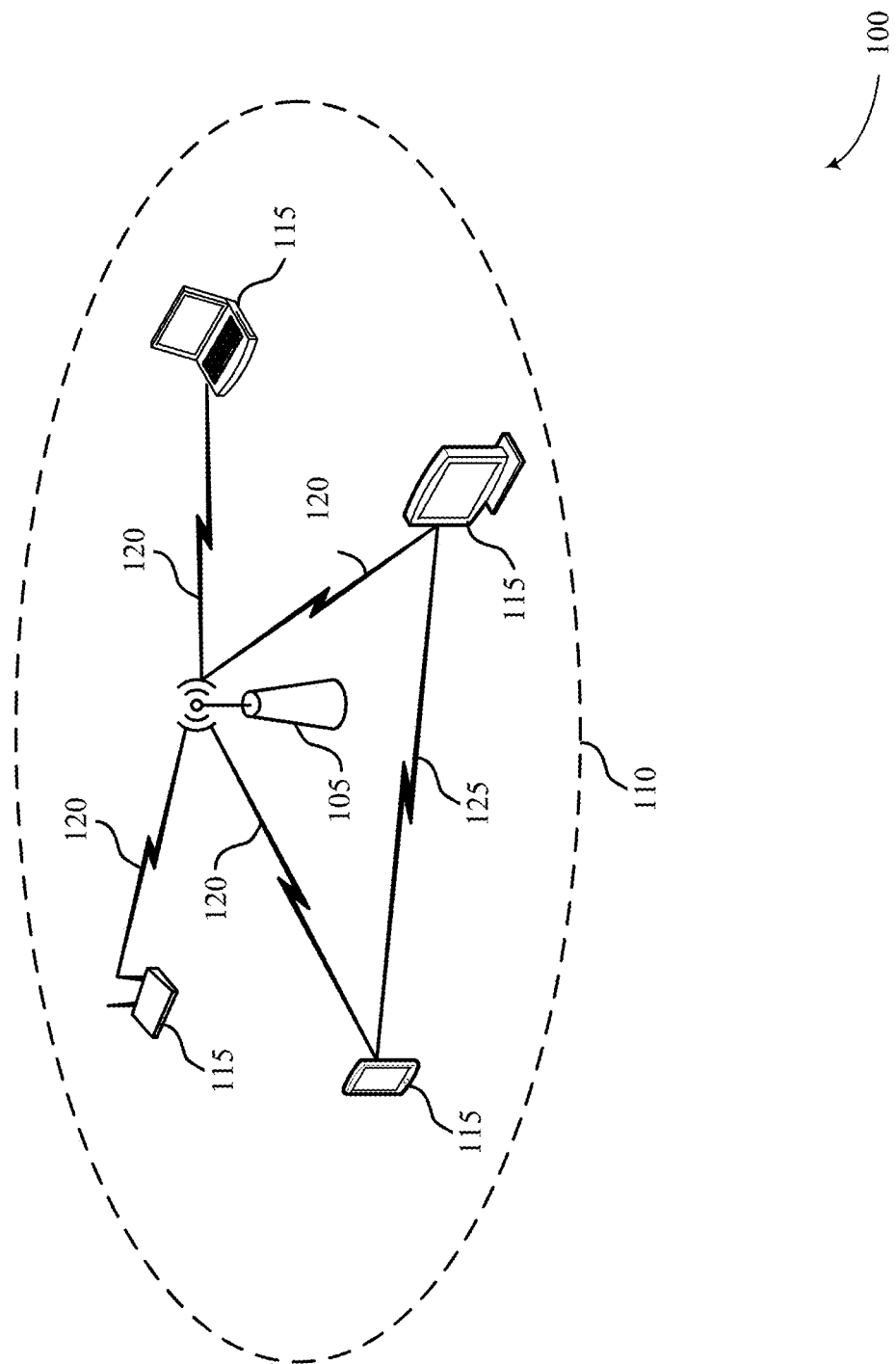
FIGS. 1 through 3 illustrate examples of a system for wireless communication that supports a distributed data center in accordance with aspects of the present disclosure.

According to the principles of the present disclosure, a distributed or decentralized cloud system with a mesh network is provided. Specifically, the distributed or decentralized cloud system with a mesh network, provides efficient interconnection between the distributed computing and storing resources. Aspects of the disclosure are initially described in the context of a wireless communications system. Exemplary wireless devices (e.g., STAs, 0, user equipment (UE), base stations (e.g., evolved NodeB (eNB), next generation NodeBs (gNBs)) that support a distributed data center are described. Aspects of the disclosure are further illustrated by and described with reference to apparatus diagrams, system diagrams, and flowcharts that relate to distributed data center FIG. 1 illustrates an example of a system 100 for wireless communication that supports a distributed data center in accordance with aspects of the present disclosure. The system 100 in some examples may be a wide area network (WAN) or a wireless local area network (WLAN) (also known as a Wi-Fi network) configured in accordance with various aspects of the present disclosure. The system 100 may include an AP 105 and multiple associated STAs 115. In some cases, the STAs 115 or the AP 105, or both may be referred to as a node. In some cases, the STAs 115 may represent wireless devices such as a device including a plurality of radios (e.g., 2 radios, 4 radios), control panels, nodes, UEs, mobile stations, personal digital assistant (PDAs), other handheld devices, netbooks, notebook computers, tablet computers, laptops, display devices (e.g., TVs, computer monitors, etc.), printers, etc.

The STAs 115 and AP 105 may be part of a mesh network with at least two pathways to each STA 115, forming a net-like organization. When each STA 115 is connected to every other STA 115, the mesh network may be a fully meshed network. When only some of the STAs 115 are linked, switching is required to make all the connections; in this case the mesh network may be partially meshed, or partially connected. The mesh network may also operate according to a radio access technology (RAT) such as a wireless WLAN, WAN, LAN, a fourth generation (4G) system such as a Long Term Evolution (LTE) system or LTE-Advanced (LTE-A) system, and fifth generation (5G) systems which may be referred to as New Radio (NR) systems, although techniques described herein may be applied to any RAT and to systems that may concurrently use two or more different RATs. In some cases, one or more of the STAs 115 and the AP 105 may establish and utilize a decentralized cloud infrastructure to share resources using the mesh network.

Each STA 115 in the system 100 may include an available resources level. The available resources level may be associated with a computing resource availability, a storage resource availability, a networking resource availability, or any combination thereof. In some cases, each STA 115 may be associated with a premise (e.g., a residential, a commercial building, an industrial facility). In some cases, the resources may be distributed across the system 100 that may be located at an edge of a mesh network. For example, the distributed resources may be located at a customer's premise or within a regional data center that may be a distance from a customer's premise. In some cases, the system 100 may be interconnected by a dynamic software defined mesh network. In this case, the system 100 using a mesh network configuration may provide lower cost per resources or may also provide and support higher data capability by leveraging a customer's premise as a location for the computing and/or storing. Additionally, by having a mesh network configuration, the system 100 may experience efficient use of resources by evading unnecessary long range transmission of content. By having storage and compute near to the point of consumption, the system 100 may provide and support higher efficiency and lower latency.

In some cases, an available computing resources level (e.g., compute and storage capacity) located in any one customer's premises may be augmented by the resources within a neighborhood area (e.g., coverage area 110) associated with a customer's premises. For example, if a customer provides a request via a STA 115 that results in a need for more processing capability than is available at the customer's premises, resources may be leveraged from spare capacity in the neighborhood area, e.g., from another customer's premises via one or more neighboring STAs 115. Similarly, if for some reason a customer's storage capacity is low (e.g. extensive amount of camera activity within a short period of time), then storage of a neighboring customer may be utilized. As such, STAs 115 in a neighborhood may combine to form a compute and storage mesh network that may be used adaptably to meet the needs of all of the combined customers.

The system 100 may establish, maintain, and handle the decentralized cloud infrastructure in a self-organizing, self-provisioning, and self-managing manner. That is, each of the STAs 115 and AP 105 may establish, maintain, and/or handle the decentralized cloud infrastructure in an automated manner without any intervention or direction from an individual of the STA 115 or administrator of the AP 105.

In some examples, the AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the system 100. An extended network station (not shown) associated with the system 100 may be connected to a wired or wireless distribution system that may allow multiple APs 105 to be connected in an ESS. Although not shown in FIG. 1, a STA 115 may be located in the intersection of more than one coverage area 110 and may associate with more than one AP 105. A single AP 105 and an associated set of STAs 115 may be referred to as a BSS.

An ESS is a set of connected BSSs. A distribution system (not shown) may be used to connect APs 105 in an ESS. In some cases, the coverage area 110 of an AP 105 may be divided into sectors (also not shown). The system 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. The STAs 115 and the APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within the system 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

In some cases, a portion or all of the STAs 115 in the system 100 may communicate with other STAs 115 using a protocol. For example, a protocol may include that the STAs 115 may use multiple connections at layer 2 (e.g., OSI model). Thus, when the system 100 is analyzed at a high level, all the STAs 115 may be interconnected such that a large mesh network of STAs 115 is formed. To enable efficient, scalable communication between the STAs 115, a number of protocols may be used. In one case, IPv6 may be used such that each STA 115 in the mesh network has a unique IPv6 address associated with a MAC address of the STA 115, with each L2 interface having its own MAC address. In some cases, one or more transmission routes between STAs 115 may exist. The STAs 115 may be capable to learn and store the transmission routes and map destination IP addresses to L2 interface to use, by relying on internal gateway protocols (IGPs) such as open shortest path first (OSPF) protocol or intermediate-system-to-intermediate-system (ISIS) protocol.

The system 100 may also support data traffic security and segregation such that any one STA 115 is not capable to reach any other STA 115 without authorization (i.e., protect or segregate STAs 115 or groups of STAs 115 from each other). In some cases, to provide security and traffic segregation, the system 100 may use tunneling and encapsulation techniques (e.g., network virtualization using generic routing encapsulation (NVGRE) protocol, or a stateless transport tunneling (STT) protocol) that may be used where tunnels are dynamically established as needed to ensure data traffic can be transferred from one STA 115 to another. One example of this may include the system 100 using a virtual extensible local area network (VxLAN) as part of an overlay networking approach, as similar to IPv6 (vs IPv4). In some examples of the system 100, software defined networking techniques may be layered on top of the security and traffic segregation layer to allow the system 100 to efficiently react to request of end user applications and setup routes and tunnels, that may not necessarily just be based on shortest path approaches.

Conventionally most traffic from distributed STAs 115 would be routed to a central gateway. Although, this may be in the same market (i.e., city or region), if the STAs 115 are located in adjacent homes and they seek to communicate (e.g., share resources), this would require traffic to be sent all the way through the network's distribution layer back to the regional data center and then back down through the network again to reach the geographically but not network logically adjacent STA. As a result, networking resources are wasted compared to if a direct connection could be formed between the STAs 115 when needed.

Figure 2:
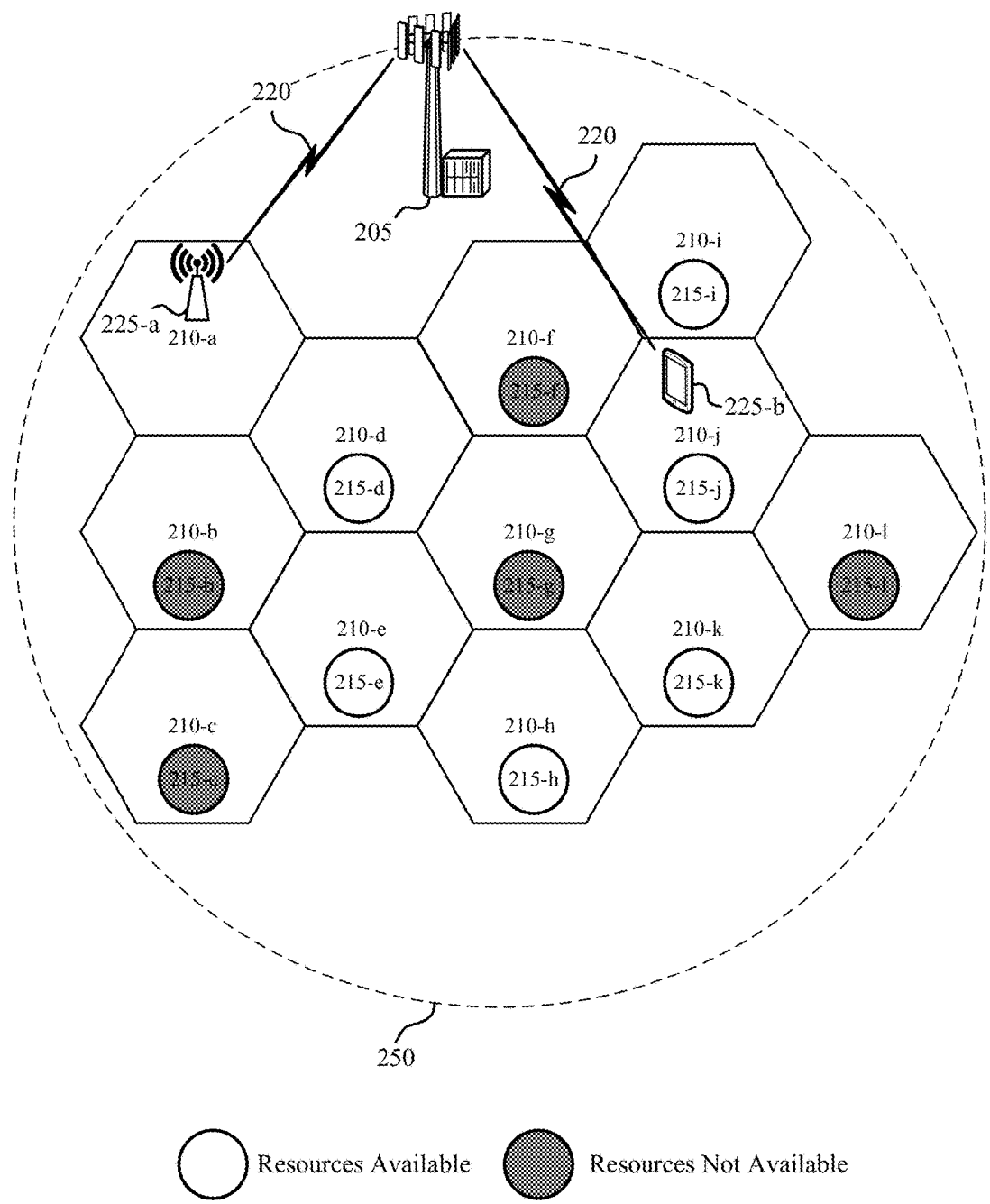

FIG. 2 illustrates an example of a system 200 that supports a distributed data center in accordance with various aspects of the present disclosure. In some examples, the system 200 may implement aspects of the system 100. The system 200 may be a mesh network that may operate according to a RAT such as a wireless WAN, WLAN, LAN, a 4G system, and/or 5G system, although techniques described herein may be applied to any RAT and to systems that may concurrently use two or more different RATs.

The mesh network may span a coverage area 250. Within the coverage area 250, a number of premises 210-a through 210-l may be present, with each premises 210 including a STA (e.g., STAs 215-b through 215-l and/or STA 225-a, 225-b). In the case that two or more different RATs may be utilized, STAs 215-b through 215-l and/or STA 225-a, 225-b may communicate with an AP 205 using a first RAT and communicate with other STAs using a second RAT. For example, the STA 225-a may communicate with the AP 205 via a cellular connection via wireless communication link 220, and communicate with a neighboring STA (e.g., STA 215-b and/or STA 215-d) via a peer-to-peer (e.g., device-to-device (D2D)) connection.

Wireless communication in the system 200 may also include uplink transmission from the STAs 215, 225 to the AP 205 and/or from the STAs 215, 225 to another STA 215,225; and/or downlink transmissions, from the AP 205 to the STAs 215, 225 and/or from the STAs 215, 225 to another STA 215, 225. The downlink transmissions may also be called forward link transmissions while the uplink transmissions may also be called reverse link transmissions. In some cases, the STAs 215, 225 and the AP 205 may transmit bidirectional communications and/or unidirectional communications. For example, some STAs 215, 225 may be configured to act as relay nodes for other STAs 215, 225 in the system 200. As a relay node, the STA may forward requests (e.g., request for storage and/or computing resources) from one STA to another STA, and may refrain from or be incapable of processing a request such as computing and/or storing data related to the request.

The STA 225-a may be associated with the premises 210-a. The STA 225-a may wirelessly communicate with one or more STAs 215 and/or the AP 205 by way of one or more antennas. The STA 225-a may perform communication configuration, resource allocation, resource distribution, and/or resource scheduling for communication with the one or more STAs 215 and/or the AP 205. In some examples, the STA 225-a may provide communication coverage for one respective coverage area of the premises 210-a (e.g., residential, commercial, industrial). That is, the STA 225-a may function as an AP for the premises 210-a. In some cases, the STA 225-a may be referred to as a control device, a controller, a control panel, a base transceiver station, a radio base station, an AP, a radio transceiver, or some other suitable terminology.

In some cases, the STA 225-a may be a control panel that may be a smart home system panel, for example, an interactive panel mounted on a wall or other surface in a home. The STA 225-a may be in direct communication with one or more sensors installed and located at the premises 210-a. The one or more sensors that may sense a proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and automation system of the premises 210-a. In some examples, the one or more sensors may form a mesh network within the premises 210-a and communicate with one another via the mesh network. In some examples, the mesh network associated with the one or more sensors may be different or be part of the mesh network associated with the STAs 215, 225.

The STA 225-a and the STA 225-b may be associated with a same premises i.e., premises 210-a. The premises 210-a may have a security and automation system installed that monitors the premises 210-a. In some examples, the STA 225-a functions as a control panel that may receive captured sensor data from one or more sensors located at the premises 210-a. The captured sensor data may include, for example, detected motion, captured audio, images, video, among others. In some cases, the STA 225-a may store captured sensor data locally or remotely. For example, the STA 225-a may store captured sensor data in a local memory or in a remote memory located at one or more of the premises 210.

The system 200 may use the mesh network to establish and utilize a decentralized cloud infrastructure to share resources among the one or more STAs 215, 225 and the AP 205. For example, each STA 215, 225 may have a local resources partition and a sharing resources partition. The local resources partition may be used for local processes such as networking, storing, computing (e.g., running and executing applications, services, streaming, requests) processes (e.g., data, content, information) initiated by the local device (e.g., STA 215, 225). The sharing resources partition may be used for allocating and distributing resources for networking, storing, computing processes received from other neighboring devices (e.g., neighboring STAs 215, 225). STAs 215, 225 may determine to distribute resources (e.g., storing, computing) across the system 200 based on local resource capability. For example, the premises 210-a through 210-l may be members of a smart neighborhood.

The smart neighborhood may include a cluster of smart homes (i.e., the premises 210-a through 210-l) that may share resources. In the case that the smart neighborhood is associated with a security service, each smart home (i.e., the premises 210-a through 210-l) of the neighborhood may be subscribed with the security service. For example, to share resources (i.e., storage and/or computing resources) within the smart neighborhood, both the STAs 215, 225 may be required to be subscribed with the same security service. In some examples, the security service may be referred to as a subscription service. The security service may also provide security transmission protocols to mitigate possibility of data being compromised during exchange between two or more STAs 215, 225. A security transmission protocol may be a wireless protected access (WPA), WPA2, among others. In some cases, the STAs 215, 225 may provide the sharing resources partition to other STAs based on the security transmission protocol.

In some cases, the STAs 215, 225 may select a neighboring STA 215 for distributing storing and/or computing resources. For example, the STA 225-a may be experiencing a low storage or computing capacity associated with a local memory or CPU (e.g., extensive amount of camera activity within a short period of time, or a substantial size (e.g., megabytes (MBs), GBs of captured sensor data)). As a result, the STA 225-a may search for storage or computing resource availability of a neighboring STA 215. The search and selection may be based on a number of parameters. One parameter may include a mesh network identifier. For example, a STA 215, 225 looking to assign a neighboring STA 215 for storing and/or computing resources may select a neighboring STA 215 that is part of a same mesh network.

The STA 225-a may also analyze a mesh network topology of the mesh network associated with the system 200, to identify and select a neighboring STA 215 for storing and/or computing resources. For example, the STA 225-a may be configured with a threshold radius, as such the STA 225-a may identify neighboring STAs 215 that have a distance that is equal to or less than the threshold radius. By applying the threshold radius, the STA 225-a may reduce latency in the system 200 by mitigating unnecessary long range transmission to neighboring STAs 215 that may be at an edge of the mesh network. Thereby, improving the efficiency of the system 200 and reducing power consumption by the STA 225-a.

In another example, the STA 225-a may analyze resource information of neighboring STAs 215 of the mesh network, for selecting a neighboring STA 215 for storing and/or computing resources. The resource information may be shared between the STAs 215, 225 during an initial establishment of the mesh network of the system 200. The AP 205 may also store the resource information and provide it to a STA 215, 225 based on a request from the STA. In some cases, each STA 215, 225 may store the resource information and update it accordingly based on new STAs joining the mesh network. Alternatively, the STA 225-a may receive the resource information from one or more of the neighboring STAs 215 based on receiving a probe response frame.

For example, the STA 225-a may broadcast a probe request frame across the mesh network. Alternatively, the STA 225-a may request the resource information from the AP 205. In the case that the AP 205 does not have stored resource information, the AP 205 may broadcast a beacon frame across the mesh network. The probe request frame and/or the beacon frame may include a mesh network identifier; as such the STA 225-*a* and/or the AP 205 may receive a probe response frame or a beacon response frame from STAs belonging to the same mesh network. One or more of the neighboring STAs 215 may receive the probe request frame and/or the beacon frame, and in response provide resource information via a probe response frame or a beacon response frame to the STA 225-*a* and/or the AP 205.

The resource information may include a geolocation of the associating STA, a computing resource availability, a storage resource availability, a networking resource availability, or any combination thereof. After the STA 225-*a* receives the resource information from one or more of the neighboring STAs 215 via the probe response frame or the AP 205 via the beacon response frame, the STA 225-*a* may analyze the resource information to select a neighboring STA 215 for storing and/or computing resources.

With reference to the above example of the STA 225-*a* experiencing a low storage or computing capacity associated with the local memory or the CPU, the STA 225-*a* may determine that a STA proximate to the STA 225-*a* (e.g., STA 215-*d*) has storage or computing resource availability to store or process the data based on the received geolocation, the computing resource availability, and the storage resource availability, or any combination thereof. Thereby, having a mesh network configuration, the system 200 may result in efficient use of resources by avoiding unnecessary extended transmission of data; unless it is to be consumed remote from the point of generation. By having storage and compute proximate to the point of consumption, enables lower latency experience for a STA 215, 225. In some cases, the STAs 215, 225 may select a neighboring STA 215, 225 for assigning storing and/or computing resources based on one or more of the parameters combined, as described above.

The STA 225-*b* associated with the premises 210-*a* may be a local computing device and/or a remote computing device, in some cases. For example, the STA 225-*b* may be mobile and roam throughout the coverage area 250. In one case, the STA 225-*b* may roam and be positioned within the premises 210-*j*. While at the premises 210-*j*, the STA 225-*b* may generate a request to receive data associated with the security and automation system of the premises 210-*a*. For example, the STA 225-*b* may receive a notification from the STA 225-*a* (i.e., control panel) indicating a sensor event. After receiving the notification, an individual may want to receive additional information such as captured video data of the premises 210-*a*.

The STA 225-*b* may transmit the request to the STA 225-*a* according to one or more transmission protocols. For instance, the STA 225-*b* may transmit the request to the STA 225-*a* via AP 205 using wireless communication link 220. The wireless communication link 220 may be a cellular connection, a millimeter wave (mmW) connection, a WAN connection, among others. The STA 225-*b* may also transmit the request to the STA 225-*a* via the mesh network, for example via D2D connections. Alternatively, the STA 225-*b* may transmit the request directly to the STA 225-*a*, for example via D2D connection when the STA 225-*a* and the STA 225-*b* are within a threshold range from each other.

While, the STA 225-*b* may transmit the request using one or more transmission protocols, the STA 225-*b* may also evaluate a route parameter to determine whether to transmit the request using a particular transmission protocol. The route parameter may include a transmit power, configuration information, signal strength, mesh network topology, etc. In an example, the STA 225-*b* may determine whether it has enough resources (e.g., transmit power, bandwidth) to transmit the request directly to the AP 205. If the STA 225-*b* determines that the resources satisfy a threshold value then the STA 225-*b* may transmit the request directly to the AP 205.

In another example, the STA 225-*b* may analyze a mesh network topology. For example, the STA 225-*b* may determine how many transmission hops are required to transmit the request and identify STAs 215 that have available network resources to facilitate the transmission. In this example, the STA 225-*b* may determine that five transmission hops (e.g., from STA 225-*b* to STA 215-*k*, from STA 215-*k* to STA 215-*h*, from STA 215-*h* to STA 215-*e*, from STA 215-*e* to STA 215-*d*, and from STA 215-*d* to STA 225-*a*) are necessary to transmit the request to the STA 225-*a*. In some cases, where the STA 225-*b* uses the mesh network to transmit the request to the STA 225-*a*, the STA 225-*b* may encode routing information with a portion of the request. The routing information may include a destination address of the STA 225-*a*. The destination address may include a MAC address associated with the STA 225-*a*. One or more of the STAs 215 may forward the request using the routing information encoded with the request.

The STA 225-*b* may also analyze and compare multiple route parameters to select a transmission route. For example, the STA 225-*b* may determine that transmitting the request via the AP 205 may be associated with a lower latency and increased power consumption, while transmitting the request via the mesh network may be associated with an increased latency and reduced power consumption. The STA 225-*b* may apply weights to different transmission factors (e.g., latency, power consumption) for selecting a transmission route. The STA 225-*b* may also apply different weights to different transmission factors. For example, the STA 225-*b* may apply a first weight to a latency factor and a second weight to a power consumption factor. The first weight may be different from the second weight. With reference to the previous example, the STA 225-*b* may select the transmission route having a lesser latency.

The STA 225-*a* may receive, from STA 225-*b*, a request for data. The data may be associated with captured sensor data by the security and automation system of the premises 210-*a*. In some examples, the STA 225-*a* may utilize computing resources of a neighboring node 215 to run an application or stream broadband multimedia data. For example, the STA 225-*a* may run an application that may have a high computing resource requirement that may be higher than an available computing resources level of the STA 225-*a*. The STA 225-*a* may decode the request and identify that the STA 225-*b* has requested the captured sensor data. In some cases, the STA 225-*a* may identify a storage location of the sensor data. For example, the STA 225-*a* may identify that the sensor data includes video data that may be stored in local memory of the STA 225-*a* or stored in remote memory of another STA 215.

In some cases, the STA 225-*a* may store association information in a local memory. The association information may correlate sensor data with a stored location and/or an identifier of a STA storing the sensor data. For example, a local memory of the STA 225-*a* may include a relational database. The relational database may include a table that may have a set of data elements (e.g., sensor information). For example, the table may include a number of columns, and a number of rows. Each row may be associated with a sensor, and each column may include information (e.g., sensor values, data type, timestamps for sensor data, among others associated with each sensor).

In one case, the STA 225-*a* may determine that the requested sensor data is stored in local memory. The STA 225-*a* in some examples may determine based on the request, that a portion of the sensor data is requested. For instance, an individual may request a snapshot of a video associated with a detected sensor event. The snapshot may be an image captured by a camera at the premises 210-*a* when a sensor detected motion proximate to an entry to a home associated with the premises 210-*a*. In some examples, the individual may request a specific timeframe, duration of the video. As such, the STA 225-*a* may have to process the video to provide a snippet of the video (i.e., associated with the specific timeframe).

In some cases, the STA 225-*a* may determine whether it would be more efficient for the STA 225-*a* to process the request (i.e., the video) or a STA closer to the STA 225-*b* (i.e., close to where the consumption happens). For example, the STA 225-*a* may analyze latency, resource utilization (e.g., computing resources), transmission route, among other factors to determine whether it would be efficient for the STA 225-*a* to process the request (i.e., the video) compared to a STA within a threshold range of the STA 225-*b*. In one example, the STA 225-*a* may identify a computing resources level (e.g., computing resources) required to process the requested data based on the request. In some cases, the STA 225-*a* may determine that the available computing resources level of the STA 225-*a* is less than the computing resources level required to process the requested data. In this case, the STA 225-*a* may search the mesh network of the system 200 for one or more STAs 215 that may be capable of processing the requested data.

The STA 225-*a* may determine that at least one STA 215 associated with STAs 215-*b* through 215-*l* has an available computing resources level to process the requested data. The STA 225-*a* may perform the determination based on the number of parameters as described herein. For example, the STA 225-*a* may analyze a mesh network topology of the mesh network to identify neighboring STAs 215 proximate to the STA 225-*b* and resource information of the neighboring STAs 215. In some examples, the STA 225-*a* may be configured with a mesh neighbor list. In some examples, this may be a list of associated STAs that may be located nearby or within a predetermined distance of the STA 225-*a*. In some examples, the mesh neighbor list may be a group of neighboring STAs 215 that may have processed data for the STA 225-*a*, 225-*b* in the past. In some cases, the STA 225-*a* may determine whether a geolocation of the STA 225-*b* is associated with a geolocation of a neighboring STA 215 in the mesh neighbor list. That is, the STA 225-*a* may determine whether the geolocation of the STA 225-*b* is linked to the premises 210-*j* that may be associated with a neighboring STA 215-*j* that may be part of the mesh neighbor list.

Alternatively, the STA 225-*a* may broadcast a probe request frame to the STAs 215-*b* through 215-*l*, or the AP 205 may broadcast a beacon frame, as described herein. The probe request frame or the beacon frame may include a mesh network identifier. As such, only STAs associated with the mesh network identifier may respond to the probe request frame or the beacon frame. For example, STA 215-*d*, STA 215-*e*, STA 215-*h*, STA 215-*i*, STA 215-*j*, and STA 215-*k* may receive the probe request frame or the beacon frame, and respond to the STA 225-*a* or the AP 205 with resource information by transmitting a probe response frame or a beacon response frame. The resource information may include a computing resource availability, a storage resource availability, a networking resource availability, or any combination thereof.

The STA 225-*a* may receive, from the STA 215-*d*, the STA 215-*e*, the STA 215-*h*, the STA 215-*i*, the STA 215-*j*, and the STA 215-*k*, one or more probe response frames via D2D connection. Alternatively, the AP 205 may receive, from the STA 215-*d*, the STA 215-*e*, the STA 215-*h*, the STA 215-*k*, and the STA 215-*j*, one or more beacon response frames and forward the resource information to the STA 225-*a* via wireless communication link 220 (e.g., cellular connection). The STA 225-*a* may determine a geolocation and available computing resources level of the STA 215-*d*, the STA 215-*e*, the STA 215-*h*, the STA 215-*i*, the STA 215-*j*, and the STA 215-*k* based on the resource information. In some cases, the STA 225-*a* may generate a table that may associate each of the STA 215-*d*, the STA 215-*e*, the STA 215-*h*, the STA 215-*i*, the STA 215-*j*, and the STA 215-*k* with a geolocation and available computing resources level. The STA 225-*a* may determine that the STA 215-*d*, the STA 215-*e*, the STA 215-*h*, the STA 215-*i*, the STA 215-*j*, and the STA 215-*k* have available resources for processing the requested data. In some cases, the STA 225-*a* may remove a number of STAs 215 (e.g., filter out) from the table by applying a rule. The rule may indicate to remove STAs that are located a distance that is above a threshold distance from the STA 225-*a*. For example, the STA 225-*a* may determine that the STA 215-*i* and the STA 215-*j* are within a threshold distance of the STA 225-*b* based on the geolocation. Thereby removing STA 215-*d*, STA 215-*e*, STA 215-*h*, and STA 215-*k* from the table.

The STA 225-*a* may apply additional analysis to the table for selecting between the STA 215-*i* and STA 215-*j* to process the requested data. For example, the STA 225-*a* may determine that the STA 215-*i* is within a first distance from the STA 225-*b*, and that the STA 215-*j* is within a second distance from the STA 225-*b*. The STA 225-*a* may compare the two distances and determine that the second distance is smaller than the first distance. As a result, the STA 225-*a* may select the STA 225-*j* to process the data. As part of the selecting, the STA 225-*a* may generate (e.g., encode) a message instructing the STA 225-*j* to process the data. The message may also include routing information such as a destination address associated with the STA 225-*b*. In the case that the STA 225-*j* is not storing the requested data, the STA 225-*a* may provide the unprocessed data to the STA 225-*j* as part of the message. Processing the data may include rendering the data (e.g., processing frames) for display at the STA 225-*b*.

In some cases, the STA 225-*a* may select a neighboring STA 215 to process the data based on the neighboring STA 215 storing the requested data. For example, the STA 225-*a* may have selected the STA 225-*j* to process the data, regardless of the distance between the STA 225-*j* and the STA 225-*b*, because the STA 225-*j* may be storing the requested data. Alternatively, the STA 225-*a* may have identified another neighboring STA such as the STA 215-*i* to process the requested data, in the case that the distance between the STA 215-*i* and the STA 225-*b* is smaller than the distance between the STA 215-*j* and the STA 225-*b*. In this case, the message transmitted to the STA 225-*j* may include instructions to retrieve the requested data from storage and forward the data to the STA 225-*i* for processing.

The STA 225-*a* may transmit the message to the STA 215-*j* via one or more transmission protocols as described herein. For example, the STA 225-*a* may transmit the message to the STA 215-*j* via the mesh network using peer-to-peer connections. Upon receiving the message, the STA 215-*j* may decode the message and process the requested data. After processing the requested data, the STA 215-*j* may transmit the processed data to the STA 225-*a*. For example, as described above, the STA 215-*j* may identify the destination address (e.g., MAC address) associated with the STA 225-*a* and transmit the processed data to the STA 225-*a* based on the destination address.

In some examples, the STAs 215 may be capable to learn and store transmission routes and map destination IP addresses to L2 interface to use, by relying on IGPs) such as OSPF protocol or ISIS protocol. Additionally, in some cases, to provide security and traffic segregation, the system 200 may use tunneling and encapsulation techniques (e.g., NVGRE protocol, or STT protocol) that may be used where tunnels are dynamically established as needed to ensure data traffic can be transferred from one STA 215, 225 to another. The STA 225-*a* may receive the processed data from the STA 215-*j*. In some examples, the STA 225-*b* may be positioned and located at the premises 210-*a*, and likewise the techniques described above may be applied.

Therefore, rather than being stored and computed at a single point (e.g., a data center node), the resources of the system 200 are spread across the STAs 215, 225 of the mesh network in a decentralized manner based on the resource requirements of each individual STA 215, 225 and are available to any STA 215, 225 of the system 200 via mesh network connection such as a peer-to-peer connection as discussed above.

Additionally, by having the mesh network configuration, the system 200 may result in efficient use of resources by avoiding unnecessary long range transmission of content; unless it is to be consumed remote from the point of generation. For example, in the case of the STA 225-*b* being located at the premises 210-*a*, rather than transmitting the request to a centralized cloud (e.g., remote data center) for post processing (e.g. find all captured images in a certain time period), that may require networking resources to transmit and receive data to and from the centralized cloud, the operations performed between the STA 225-*a* and the centralized cloud may be improved by distributing the storage and computing resources closer to the STA 225-*a*, 225-*b* e.g., the neighboring STAs 215. By having storage and compute proximate to the point of consumption, it enables lower latency experience for the system 200.

Figure 3:
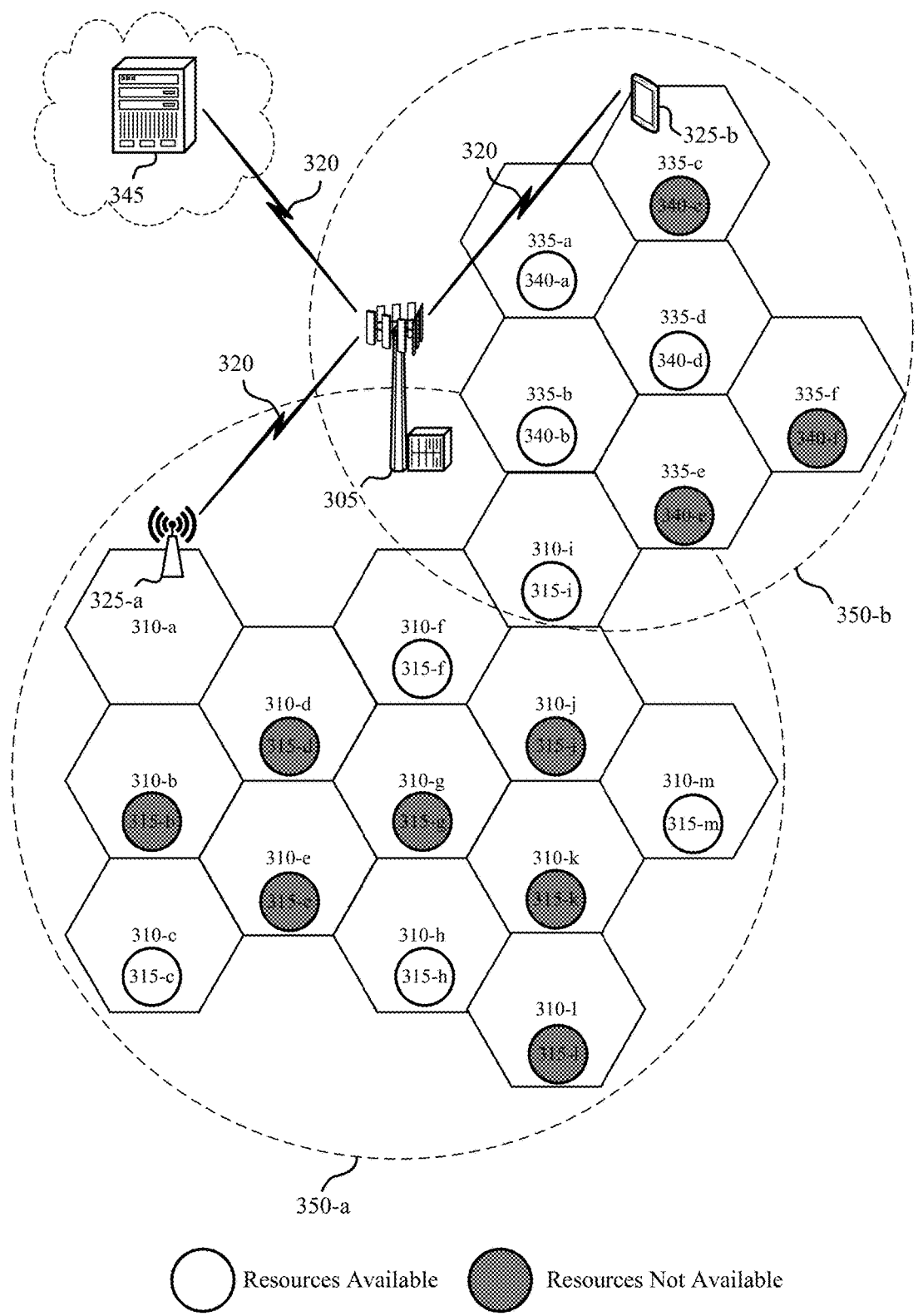

FIG. 3 illustrates an example of a system 300 that supports distributed data center in accordance with various aspects of the present disclosure. In some examples, system 300 may implement aspects of the system 100 and 200. The system 300 may be a mesh network that may operate according to a RAT such as a wireless WLAN, WAN, LAN, a 4G system, and/or 5G system, although techniques described herein may be applied to any RAT and to systems that may concurrently use two or more different RATs. In some cases, the system 300 may utilize the mesh network to establish and utilize a decentralized cloud infrastructure to share resources among the one or more STAs and the AP.

Regionally located data centers including compute and storage resources may augment those in a neighborhood area, as well as those in national data centers. In some cases, the regional located data centers may be used to serve requests for STAs that may be remote from a neighborhood cluster of compute resources. For example, a customer may request to analyze and view stored video footage from their home. In this case, the customer may be located remote from the home and the neighborhood area. As such, compute nodes of the regional data center may serve the request, while compute nodes located proximate to the point of storage may process the data. This way, the computing resources are effectively distributed to optimize the utilization of the system 300 by limiting unnecessary transmission of unprocessed content or serving user requests by some distant, remote compute node.

A first mesh network may span a coverage area 350-*a*. The first mesh network may implement aspects of the system 100 and 200. Within the coverage area 350-*a*, a number of premises 310-*a* through 310-*l* may be present, with each premises 310 including a STA (e.g., STAs 315-*b* through 315-*l* and/or STA 325-*a*). In the case that two or more different RATs may be utilized, STAs 315-*b* through 315-*l* and/or STA 325-*a* may communicate with an AP 305 using a first RAT and communicate with other STAs using a second RAT. For example, the STA 325-*a* may communicate with the AP 305 via a cellular connection via wireless communication link 320, and communicate with a neighboring STA (e.g., STA 315-*b* and/or STA 315-*d*) via a peer-to-peer (e.g., device-to-device (D2D)) connection.

A second mesh network may span a coverage area 350-*b*. The second mesh network may also implement aspects of the system 100 and 200. Within the coverage area 350-*b*, a number of premises 335-*a* through 335-*f* may be present, with each premises 335 including a STA (e.g., STAs 340-*a* through 340-*f* and/or STA 325-*b*). The STAs 340-*a* through 340-*f* and/or the STA 325-*b* may communicate with the AP 305 using a first RAT and communicate with other STAs using a second RAT. For example, the STA 325-*b* may communicate with the AP 305 via a cellular connection via wireless communication link 320, and communicate with a neighboring STA (e.g., STA 340-*c*) via a peer-to-peer connection. In some cases, the coverage area 350-*a*, 350-*b* may partially overlap, and overlapping coverage areas 350-*a*, 350-*b* may be supported by a same AP 305 or by different APs. The system 300 may use the first and the second mesh network to establish and utilize a decentralized cloud infrastructure to share resources among the one or more STAs 315, 325, and 340, and the AP 305.

In the system 300, wireless communication may also include uplink transmission from the STAs 315, 325, 340 to the AP 305 and/or from the STAs 315, 325, 340 to another STA 315, 325, 340; and/or downlink transmissions, from the AP 305 to the STAs 315, 325, 340 and/or from the STAs 315, 325, 340 to another STA 315, 325, 340. In some cases, the STAs 315, 325, 340 and the AP 305 may transmit bidirectional communications and/or unidirectional communications. For example, some STAs 315, 325 may be configured to act as relay nodes for other STAs 315, 325, 340 in the system 300.

With reference to the example of FIG. 2, the STA 325-*a* and the STA 325-*b* may be associated with a same premises i.e., premises 310-*a*. The premises 310-*a* may have a security and automation system installed that monitors the premises 310-*a*. In some examples, the STA 325-*a* functions as a control panel that may receive captured sensor data from one or more sensors located at the premises 310-*a*. The captured sensor data may include, for example, detected motion, captured audio, images, video, among others. The STA 325-*b* may be a local computing device and/or a remote computing device, in some cases. For example, the STA 325-*b* may be mobile and roam throughout the geographic coverage area 350-*a* or 350-*b*. In one case, the STA 325-*b* may roam and be positioned within the premises 335-*c*.

At the premises 335-*c*, the STA 325-*b* may generate a request to receive data associated with the security and automation system of the premises 310-*a*. In this case, the STA 325-*b* is located remote from the premises 310-*a* and the neighborhood area (i.e., the first mesh network associated with the coverage area 350-*a*). As such, the STA 325-*b* may transmit the request to a compute node of a regional data center 345 that may serve the request. The regional data center 345 may serve the request and identify a compute node (e.g., STAs 315 and/or 340) located proximate to a point of storage that may process the data. For example, the regional data center 345 may identify that the STA 340-*b* is a storage node for the requested data. That is, the STA 340-*b* has the requested data stored in local memory. The regional data center 345 may identify the storage node based on configuration information as described herein.

The regional data center 345 may then identify a STA 340 is within a threshold distance from the STA 340-*b* and/or the STA 325-*b* that has computing resource availability to process the data. For example, the regional data center 345 may identify STA 340-*d* having computing resource availability to process the data based one or more techniques as described herein. The regional data center 345 may then generate and transmit a message instructing the STA 340-*b* to forward requested data to the STA 340-*d*. The STA 340-*d* may receive the data and instructions to process the data. The STA 340-*d* may transmit the processed data to the STA 325-*b*. The instructions may include a destination address associated with the STA 325-*b*.

Alternatively, the STA 325-*b* may transmit the request to the STA 325-*a* via the AP 305 using wireless communication link 320 or via the mesh network using peer-to-peer connections. The STA 325-*b* may receive the request and determine that the available computing resources level of one or more of the neighboring STAs 315 in the first mesh network of the coverage area 350-*a* do not satisfy a computing resources level required to process the data, as described herein. The STA 325-*a* may transmit the request to the regional data center 345 for processing the data. The STA 325-*a* may transmit the request directly to the regional data center 345 or by means of transmitting it to the AP 305 via wireless communication link 320. The STA 325-*a* may receive the processed data from the regional data center 345, and forward the processed data from the STA 325-*a* to the STA 325-*b* via the first and the second mesh network using peer-to-peer connections or any other transmission protocol (e.g., mmW connections).

Alternatively, after receiving the request from the STA 325-*a*, the regional data center 345 may identify a STA 340 of the second mesh network that has available computing resources to process the data based on configuration information. For example, if the regional data center 345 identifies STA 340-*a* of the second mesh network that has available computing resources to process the data, the regional data center 345 may instruct the STA 340-*a* to process the data and transmit the processed data to the STA 325-*b* via at least one transmission protocol.

The system 300 may utilize compute nodes of a regional data center that may serve the request, while compute nodes located proximate to the point of storage may process the data. Thereby, the computing resources are effectively distributed to optimize the utilization of the system 300 by limiting unnecessary transmission of unprocessed content or serving user requests by some distant, remote compute node.

Figure 4:
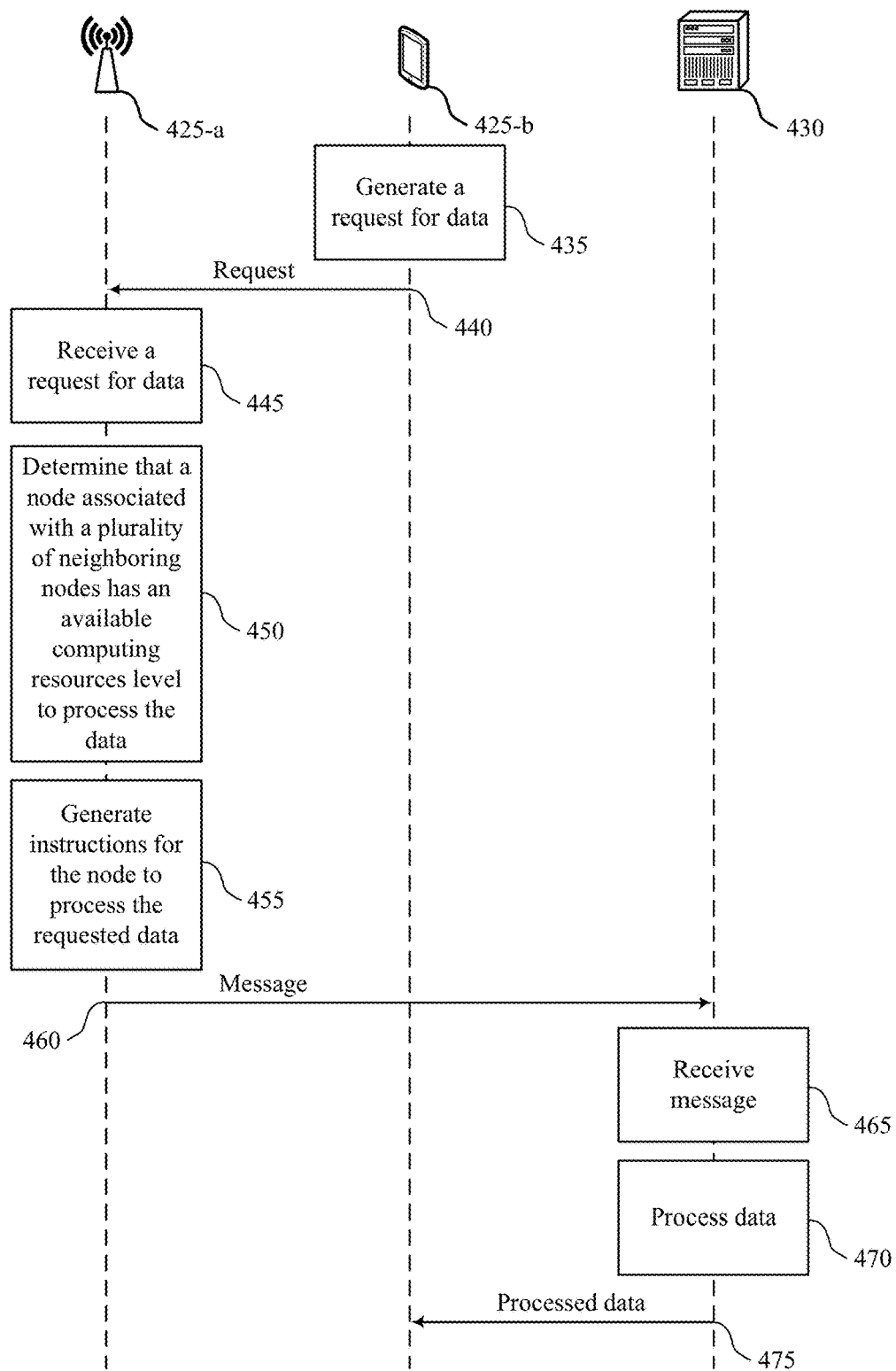
FIG. 4 illustrates an example of a process flow that supports a distributed data center in accordance with aspects of the present disclosure.

FIG. 4 illustrates an example of a process flow 400 that supports a distributed data center in accordance with various aspects of the present disclosure. In some examples, process flow 400 may implement aspects of the system 100 through 300. STA 425-*a*, STA 425-*b*, and STA 430 may be examples of the corresponding devices described with reference to FIGS. 1 through 3. In the following description of the process flow 400, the operations between the STA 425-*a*, the STA 425-*b*, and the STA 430 may be transmitted in a different order than the exemplary order shown, or the operations performed by the STA 425-*a*, the STA 425-*b*, and the STA 430 may be performed in different orders or at different times. Certain operations may also be left out of the process flow 400, or other operations may be added to the process flow 400.

The STA 425-*a*, the STA 425-*b*, and the STA 430 may be part of a same or different mesh network. For example, in one case, the STA 425-*a*, the STA 425-*b*, and the STA 430 may be part of a same mesh network. In another case, the STA 425-*a* may be associated with a first mesh network and the STA 425-*b* and the STA 430 may be associated with a second mesh network. The mesh network may also operate according to a RAT such as a WLAN, LAN, a 4G system such as a LTE system or LTE-A system, and 5G systems which may be referred to as NR systems, although techniques described herein may be applied to any RAT and to systems that may concurrently use two or more different RATs.

At 435, the STA 425-*b* may generate a request for data. The data may include multimedia data or sensor data associated with a security and automation system. At 440, the STA 425-*b* may transmit the request to the STA 425-*a*.

At 445, the STA 425-*a* may receive the request for the data. At 450, the STA 425-*a* may determine that a node (i.e., STA 430) associated with a plurality of neighboring nodes has an available computing resources level to process the data. In some cases, the STA 425-*a* may determine that the node (i.e., STA 430) has the available computing resources level to process the data based on configuration information. The configuration information may include at least one of a mesh network identifier, a mesh network topology, a mesh neighbor list, resource information, or a combination thereof. The resource information may also include a computing resource availability, a storage resource availability, or both.

At 455, the STA 425-*a* may generate instructions for the node (i.e., STA 430) to process the requested data. At 460, the STA 425-*a* may transmit a message to the STA 430. At 465, the STA 430 may receive the message. At 470, the STA 430 may process the data. At 475, the STA 430 may transmit the processed data to the STA 425-*b*.

Figure 5:
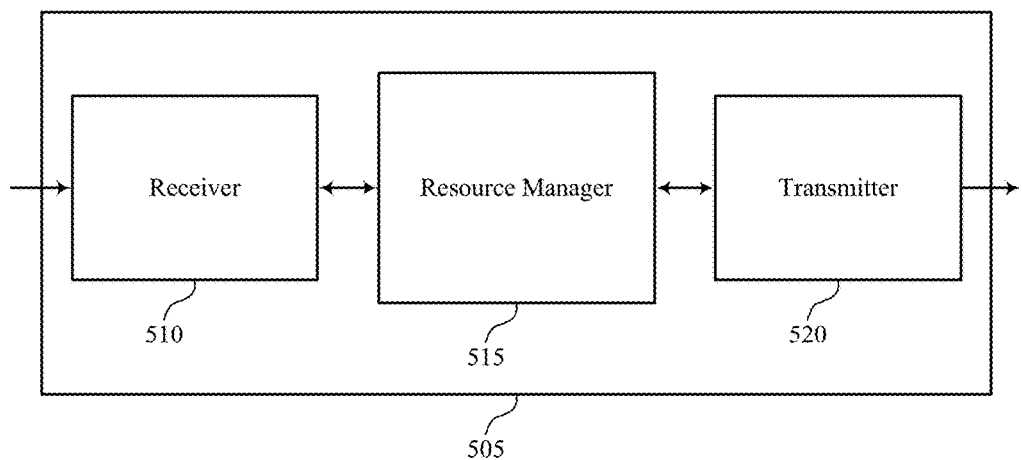
FIGS. 5 through 7 show block diagrams of a device that supports a distributed data center in accordance with aspects of the present disclosure.

FIG. 5 shows a block diagram 500 of a wireless device 505 that supports a distributed data center in accordance with aspects of the present disclosure. Wireless device 505 may be an example of aspects of a STA 115 or AP 105 as described herein. Wireless device 505 may be an example of a node (e.g., UE, base station, STA, AP, core network) in a mesh network. The mesh network may also operate according to a RAT such as a WLAN, LAN, a 4G system such as a LTE system or LTE-A system, and 5G systems which may be referred to as NR systems, although techniques described herein may be applied to any RAT and to systems that may concurrently use two or more different RATs. Wireless device 505 may include receiver 510, resource manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to distributed data center, etc.). Information may be passed on to other components of the device. The receiver 510 may be an example of aspects of the transceiver 835 described with reference to FIG. 8. The receiver 510 may utilize a single antenna or a set of antennas.

Resource manager 515 may be an example of aspects of the resource manager 815 described with reference to FIG. 8. Resource manager 515 and/or at least some of its various sub-components may be implemented in hardware, software executed by a processor, firmware, or any combination thereof. If implemented in software executed by a processor, the functions of the resource manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The resource manager 515 and/or at least some of its various sub-components may be physically located at various positions, including being distributed such that portions of functions are implemented at different physical locations by one or more physical devices. In some examples, resource manager 515 and/or at least some of its various sub-components may be a separate and distinct component in accordance with various aspects of the present disclosure. In other examples, resource manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Resource manager 515 may receive, at a first node of a mesh network from a second node, a request for data associated with a security and automation system, determine, at the first node, that a third node associated with a set of neighboring nodes within the mesh network has an available computing resources level to process the data based on configuration information of the mesh network, and transmit, from the first node to the third node, a message instructing the third node to process the data.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
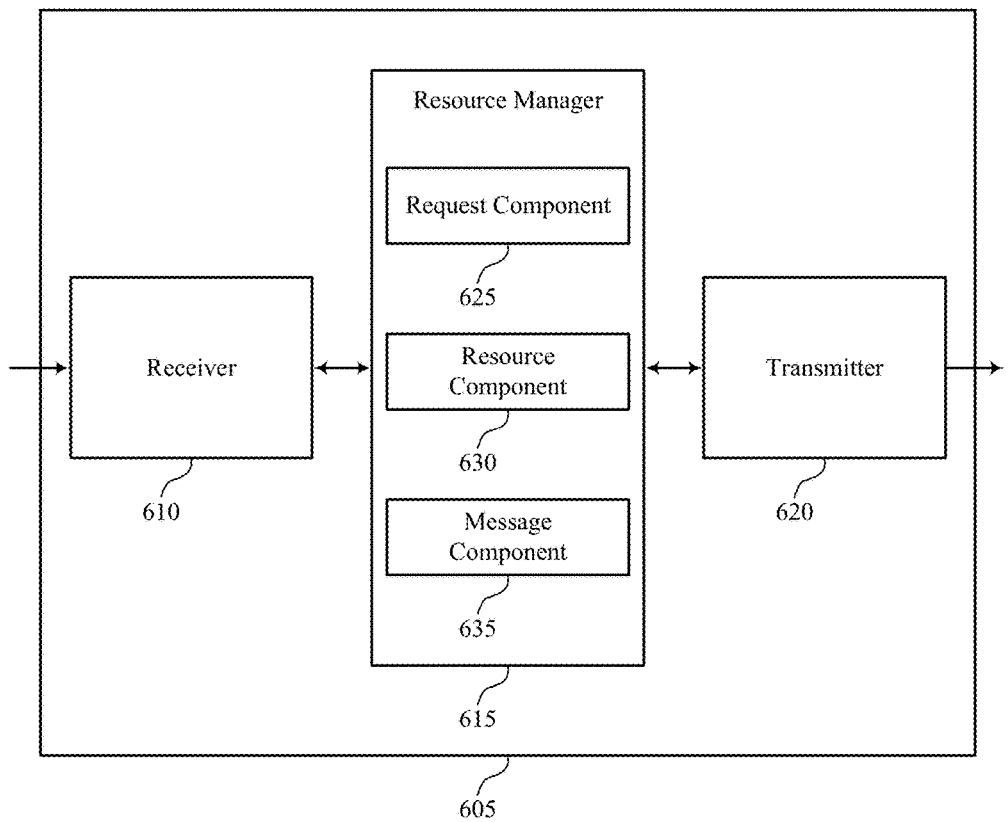

FIG. 6 shows a block diagram 600 of a wireless device 605 that supports distributed data center in accordance with aspects of the present disclosure. Wireless device 605 may be an example of aspects of a wireless device 505 or a STA 115 or AP 105 as described with reference to FIG. 5. Wireless device 605 may be an example of a node (e.g., UE, base station, STA, AP, core network) in a mesh network. The mesh network may also operate according to a RAT such as a WLAN, LAN, a 4G system such as a LTE system or LTE-A system, and 5G systems which may be referred to as NR systems, although techniques described herein may be applied to any RAT and to systems that may concurrently use two or more different RATs. Wireless device 605 may include receiver 610, resource manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to distributed data center, etc.). Information may be passed on to other components of the device. The receiver 610 may be an example of aspects of the transceiver 835 described with reference to FIG. 8. The receiver 610 may utilize a single antenna or a set of antennas.

Resource manager 615 may be an example of aspects of the resource manager 815 described with reference to FIG. 8. Resource manager 615 may also include request component 625, resource component 630, and message component 635.

Request component 625 may receive, at a first node of a mesh network from a second node, a request for data associated with a security and automation system. Request component 625 may determine, at the first node, a source address associated with the requested data based on the received request. In some cases, receiving the request for data from the second node may be based on a first RAT connection established between the first node and the second node.

Resource component 630 may determine, at the first node, that a third node associated with a set of neighboring nodes within the mesh network has an available computing resources level to process the data based on configuration information of the mesh network. Resource component 630 may determine, at the first node, that the available computing resources level of the first node may be less than a computing resources level required to process the data.

Resource component 630 may determine, at the first node, a geolocation and available computing resources level of the one or more neighboring nodes based on the received beacon response frame or the received probe response frame. Resource component 630 may determine, at the first node, that the one or more neighboring nodes includes the third node and a fourth node of the set of neighboring nodes have available computing resource to process the data.

Resource component 630 may determine, at the first node, that the determined available computing resources level of the one or more neighboring nodes of the set of neighboring nodes in the mesh network do not satisfy the computing resources level required to process the data. Resource component 630 may receive, at the first node from a fifth node, the processed data based on determining that the determined available computing resources level of the one or more neighboring nodes do not satisfy the computing resources level required to process the data. In some cases, the configuration information includes at least one of a mesh network ID, a mesh network topology, a mesh neighbor list, resource information, or a combination thereof. In some cases, the resource information includes a computing resource availability, a storage resource availability, or both. In some cases, the fifth node is a node in a second mesh network different from the mesh network.

Message component 635 may transmit, from the first node to the third node, a message instructing the third node to process the data. In some cases, transmitting the message may be based on a second RAT connection established between the first node and the third node. In some examples, transmitting the message instructing the third node to process the data may be further based on the available computing resources level of the first node being less than the computing resources level required to process the data.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
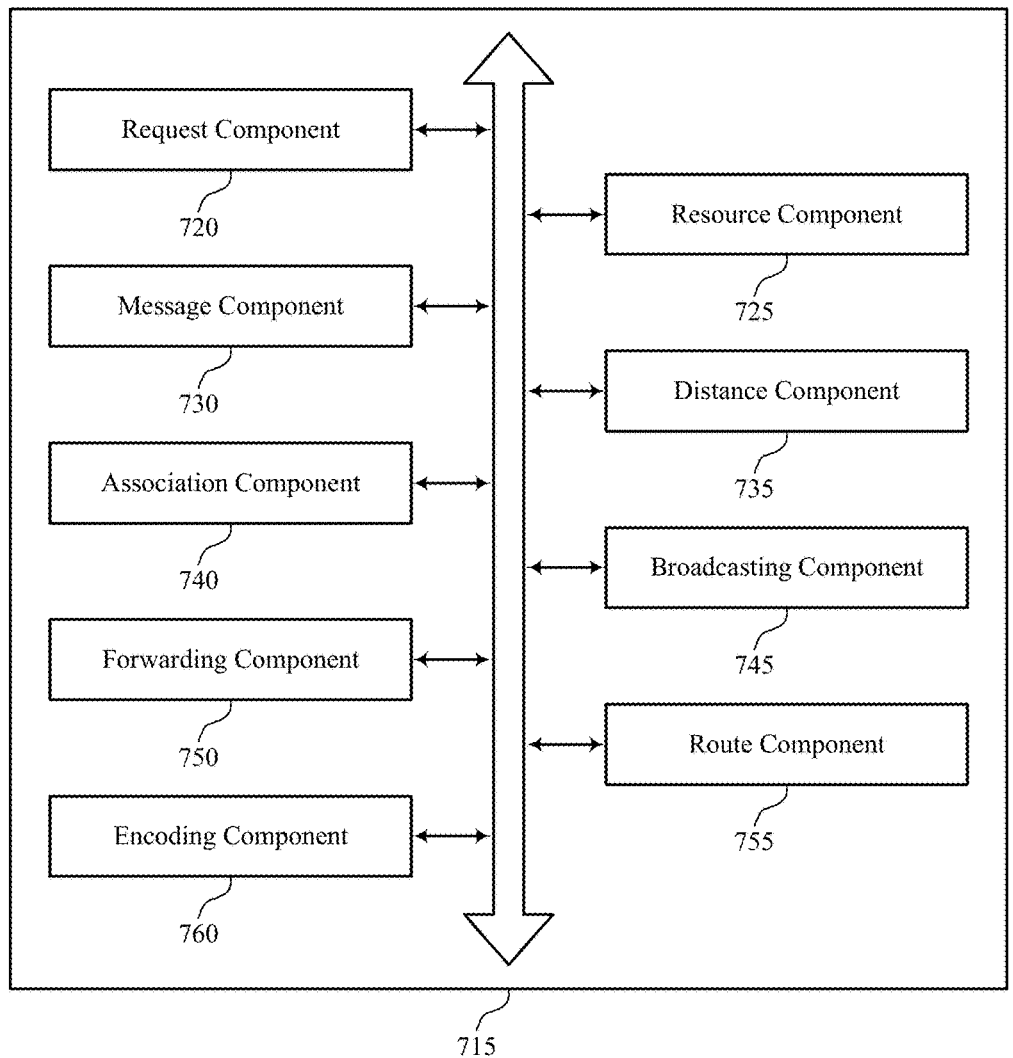

FIG. 7 shows a block diagram 700 of a resource manager 715 that supports distributed data center in accordance with aspects of the present disclosure. The resource manager 715 may be an example of aspects of a resource manager 515, a resource manager 615, or a resource manager 815 described with reference to FIGS. 5, 6, and 8. The resource manager 715 may include request component 720, resource component 725, message component 730, distance component 735, association component 740, broadcasting component 745, forwarding component 750, route component 755, and encoding component 760. Each of these modules may communicate, directly or indirectly, with one another (e.g., via one or more buses).

Request component 720 may receive, at a first node of a mesh network from a second node, a request for data associated with a security and automation system. Request component 720 may determine, at the first node, a source address associated with the requested data based on the received request. In some cases, the receiving the request for data from the second node is based on a first RAT connection established between the first node and the second node.

Resource component 725 may determine, at the first node, that a third node associated with a set of neighboring nodes within the mesh network has an available computing resources level to process the data based on configuration information of the mesh network. Resource component 725 may determine, at the first node, that the available computing resources level of the first node is less than a computing resources level required to process the data.

Resource component 725 may determine, at the first node, that the available computing resources level of the first node is less than a computing resources level required to process the data. Resource component 725 may determine, at the first node, a geolocation and available computing resources level of the one or more neighboring nodes based on the received beacon response frame or the received probe response frame. Resource component 725 may determine, at the first node, that the one or more neighboring nodes includes the third node and a fourth node of the set of neighboring nodes have available computing resource to process the data.

Resource component 725 may determine, at the first node, that the determined available computing resources level of the one or more neighboring nodes of the set of neighboring nodes in the mesh network do not satisfy the computing resources level required to process the data. Resource component 725 may receive, at the first node from a fifth node, the processed data based on determining that the determined available computing resources level of the one or more neighboring nodes do not satisfy the computing resources level required to process the data. In some cases, the configuration information includes at least one of a mesh network ID, a mesh network topology, a mesh neighbor list, resource information, or a combination thereof. In some cases, the resource information includes a computing resource availability, a storage resource availability, or both. In some cases, the fifth node is a node in a second mesh network different from the mesh network.

Message component 730 may transmit, from the first node to the third node, a message instructing the third node to process the data. In some cases, transmitting the message may be based on a second RAT connection established between the first node and the third node. In some examples, the first RAT connection or the second RAT connection may include at least one of a device-to-device (D2D) connection, a wide area network (WAN) connection, a WLAN connection, a millimeter wave (mmW) connection, or a cellular connection (e.g., LTE, LTE-A). In some examples, transmitting the message instructing the third node to process the data is further based on the available computing resources level of the first node being less than the computing resources level required to process the data.

Distance component 735 may determine, at the first node, that the third node is within a threshold distance of the second node based on the configuration information. In some examples, transmitting the message may be based on determining that the third node is within the threshold distance. Distance component 735 may determine that the third node is within a first distance from the second node based on the geolocation. Distance component 735 may determine that the fourth node is within a second distance from the second node based on the geolocation. Distance component 735 may determine that the first distance is smaller than the second distance. In some examples, transmitting, from the first node to the third node, the message may be further based on the first distance being smaller than the second distance.

Association component 740 may determine, at the first node, that the third node is associated with the source address based on the configuration information. In some examples, transmitting the message to the third node may be further based on determining that the third node is associated with the source address. Association component 740 may determine, at the first node, that the first node is associated with the source address based on the configuration information.

Broadcasting component 745 may broadcast, by the first node, a beacon frame or a probe request frame to the set of neighboring nodes within the mesh network. Broadcasting component 745 may receive, at the first node, a beacon response frame or a probe response frame from one or more neighboring nodes of the set of neighboring nodes in the mesh network.

Forwarding component 750 may forward the processed data from the first node to the third node for transmitting to the second node. Route component 755 may determine routing information based on the configuration information. Encoding component 760 may encode the routing information with a portion of the message.

Figure 8:
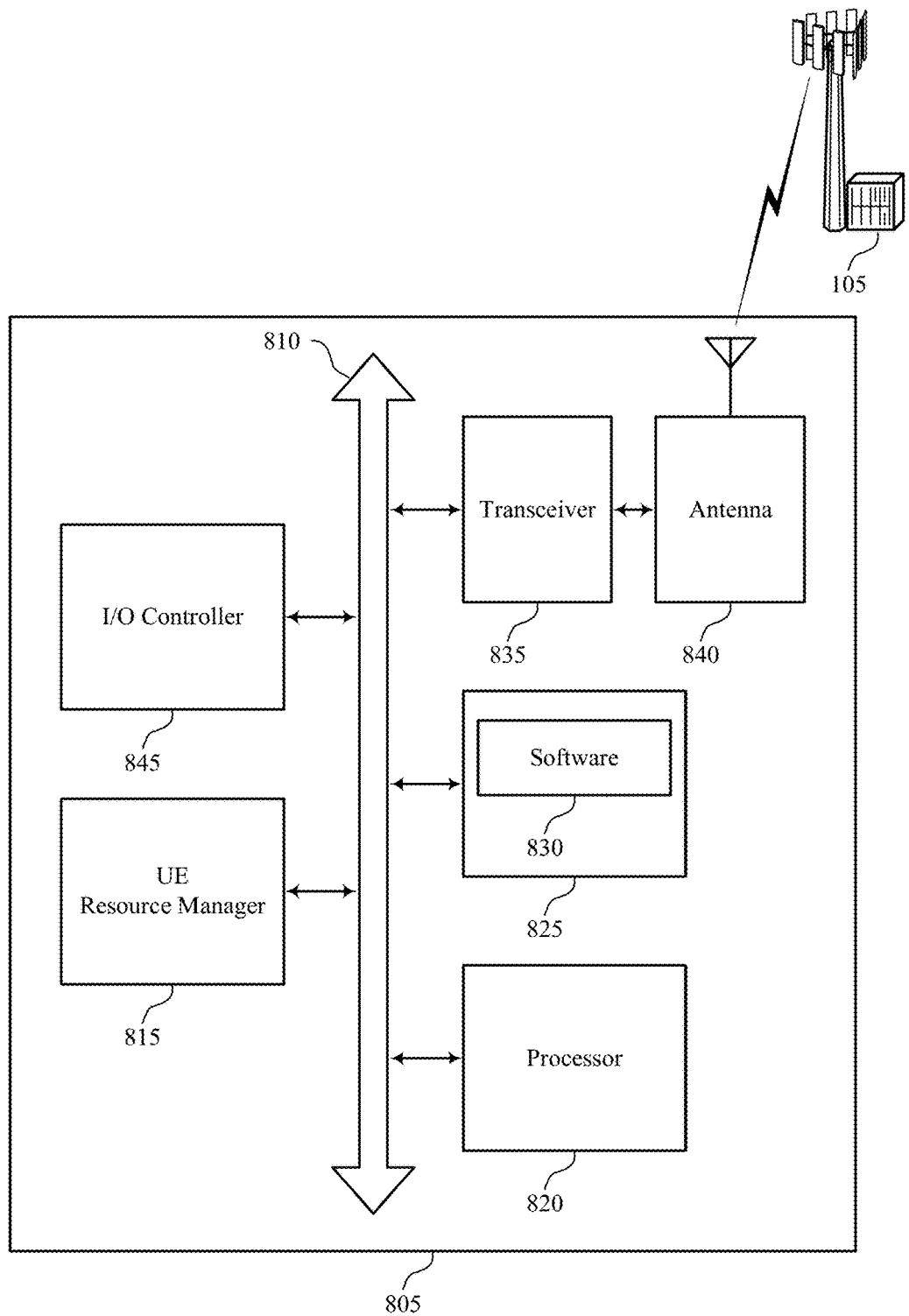
FIG. 8 illustrates a block diagram of a system including a UE that supports a distributed data center in accordance with aspects of the present disclosure.

FIG. 8 shows a diagram of a system 800 including a device 805 that supports distributed data center in accordance with aspects of the present disclosure. Device 805 may be an example of or include the components of wireless device 505, wireless device 605, or a STA 115 as described above, e.g., with reference to FIGS. 5 and 6. Device 805 may include components for bi-directional voice and data communications including components for transmitting and receiving communications, including resource manager 815, processor 820, memory 825, software 830, transceiver 835, antenna 840, and I/O controller 845. These components may be in electronic communication via one or more buses (e.g., bus 810). Device 805 may communicate wirelessly with one or more APs 105.

Processor 820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820.

Processor 820 may be configured to execute computer-readable instructions stored in a memory to perform various functions (e.g., functions or tasks supporting distributed data center).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support distributed data center. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
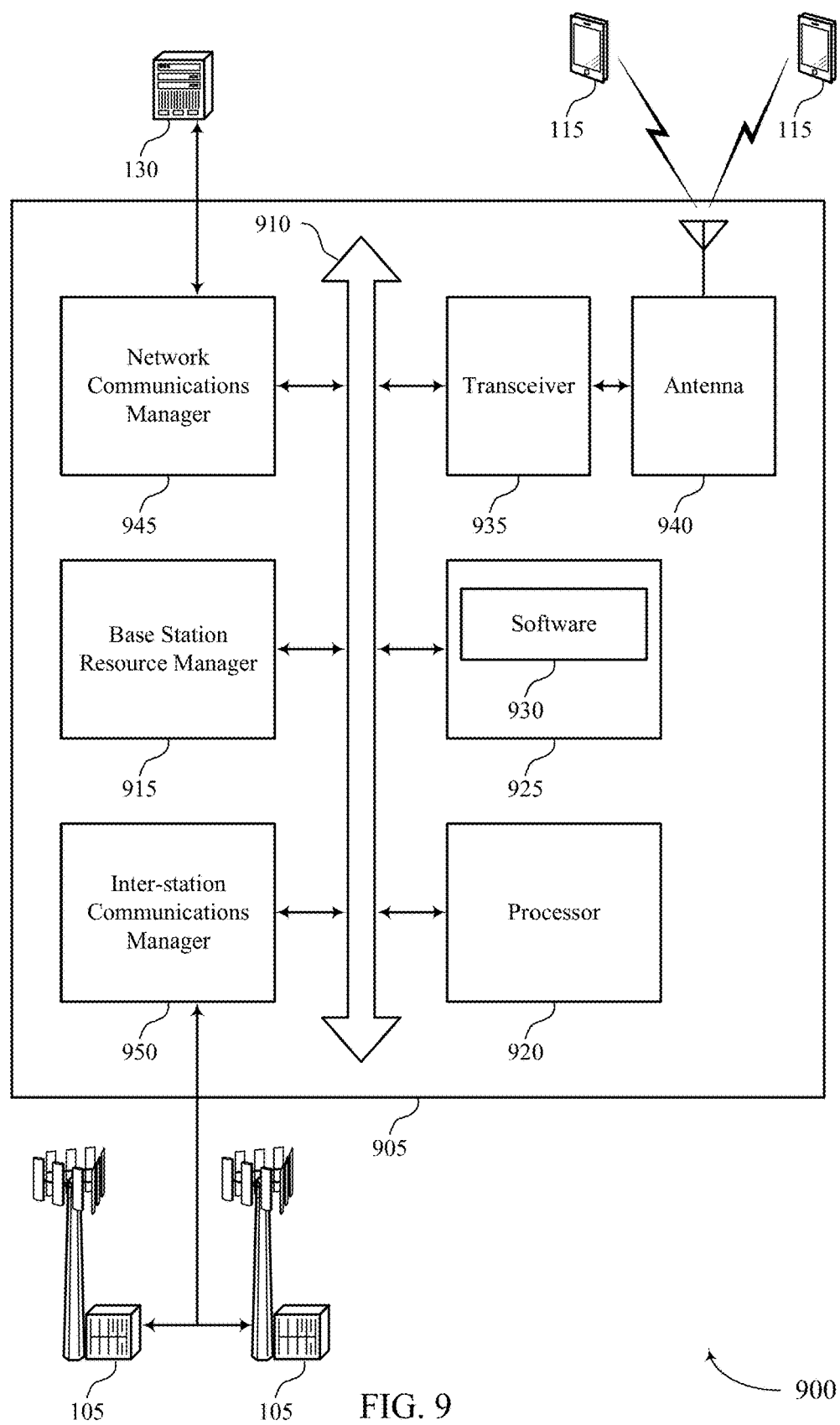
FIG. 9 illustrates a block diagram of a system including an AP that supports a distributed data center in accordance with aspects of the present disclosure.

FIG. 9 shows a diagram of a system 900 including a device 905 that supports distributed data center in accordance with aspects of the present disclosure. Device 905 may be an example of or include the components of wireless device 605, wireless device 705, or a AP 105 as described above, e.g., with reference to FIGS. 6 and 7. Device 905 may include components for bi-directional voice and data communications including components for transmitting and receiving communications, including base station resource manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more STAs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting distributed data center).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware or software operation such as the interaction with peripheral components or devices.

Software 930 may include code to implement aspects of the present disclosure, including code to support distributed data center. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more STAs 115.

Inter-station communications manager 950 may manage communications with other AP 105, and may include a controller or scheduler for controlling communications with STAs 115 in cooperation with other APs 105. For example, the inter-station communications manager 950 may coordinate scheduling for transmissions to STAs 115 for various interference mitigation techniques such as beamforming or joint transmission. In some examples, inter-station communications manager 950 may provide an X2 interface within an Long Term Evolution (LTE)/LTE-A wireless communication network technology to provide communication between APs 105.

Figure 10:
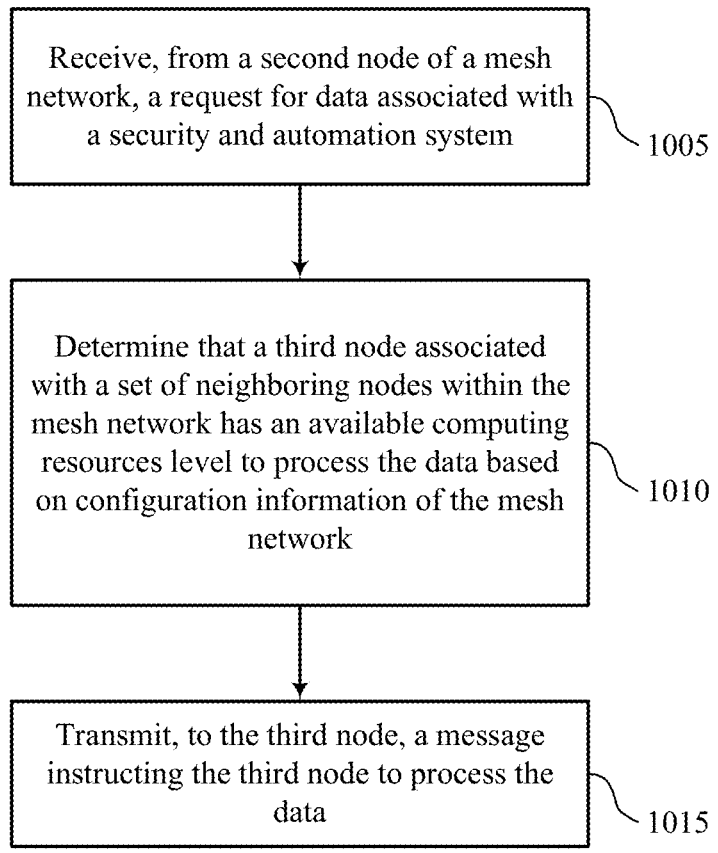
FIGS. 10, 11A, 11B, 12A, and 12B illustrate methods related to a distributed data center in accordance with aspects of the present disclosure.

FIG. 10 shows a flowchart illustrating a method 1000 for distributed data center in accordance with aspects of the present disclosure. The operations of method 1000 may be implemented by a STA 115 or AP 105 or its components as described herein. For example, the operations of method 1000 may be performed by a resource manager as described with reference to FIGS. 5 through 7. In some examples, a STA 115 or AP 105 may execute a set of codes to control the functional elements of the device to perform the functions described below. Additionally or alternatively, the STA 115 or AP 105 may perform aspects of the functions described below using special-purpose hardware.

At 1005 the STA 115 or AP 105 may receive, from a second node of a mesh network, a request for data associated with a security and automation system. The operations of 1005 may be performed according to the methods described herein. In certain examples, aspects of the operations of 1005 may be performed by a request component as described with reference to FIGS. 5 through 7.

At 1010 the STA 115 or AP 105 may determine that a third node associated with a plurality of neighboring nodes within the mesh network has an available computing resources level to process the data based on configuration information of the mesh network. The operations of 1010 may be performed according to the methods described herein. In certain examples, aspects of the operations of 1010 may be performed by a resource component as described with reference to FIGS. 5 through 7.

At 1015 the STA 115 or AP 105 may transmit, to the third node, a message instructing the third node to process the data. The operations of 1015 may be performed according to the methods described herein. In certain examples, aspects of the operations of 1015 may be performed by a message component as described with reference to FIGS. 5 through 7.

Figure 11A:
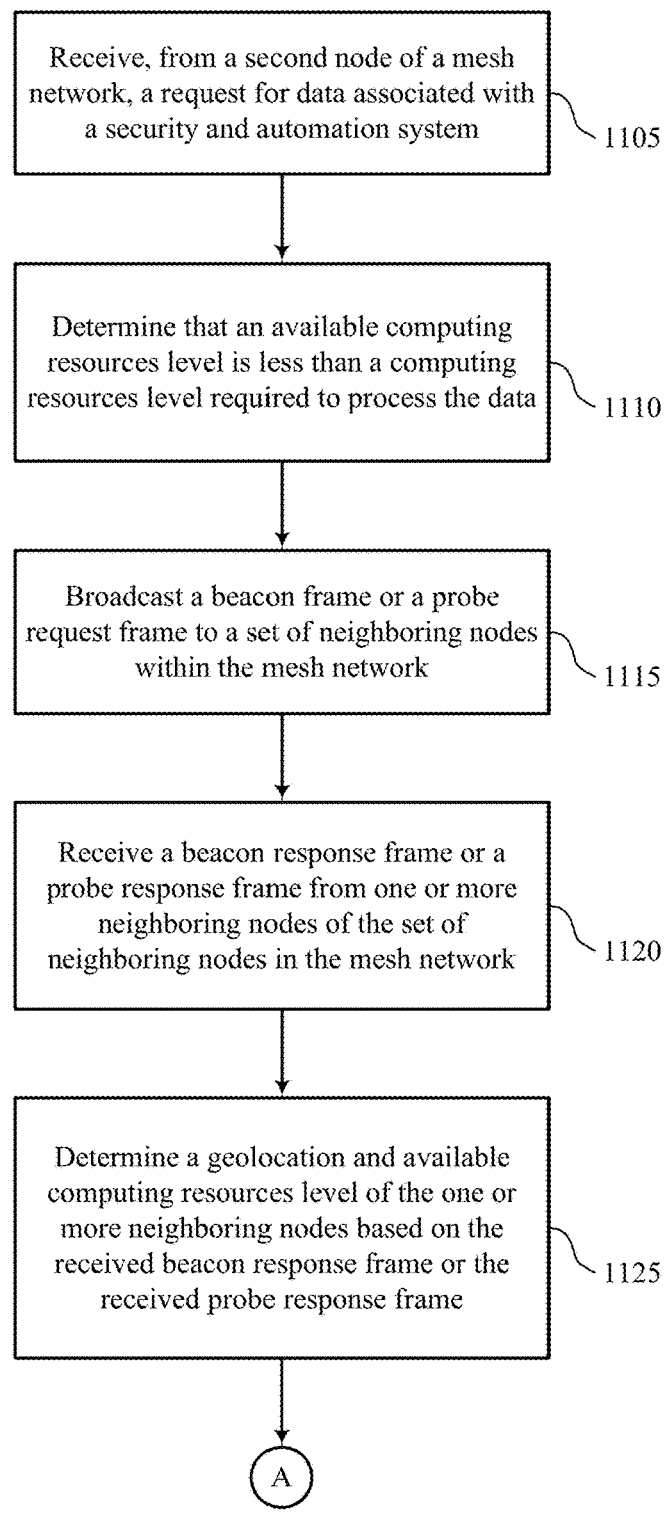
Figure 11B:
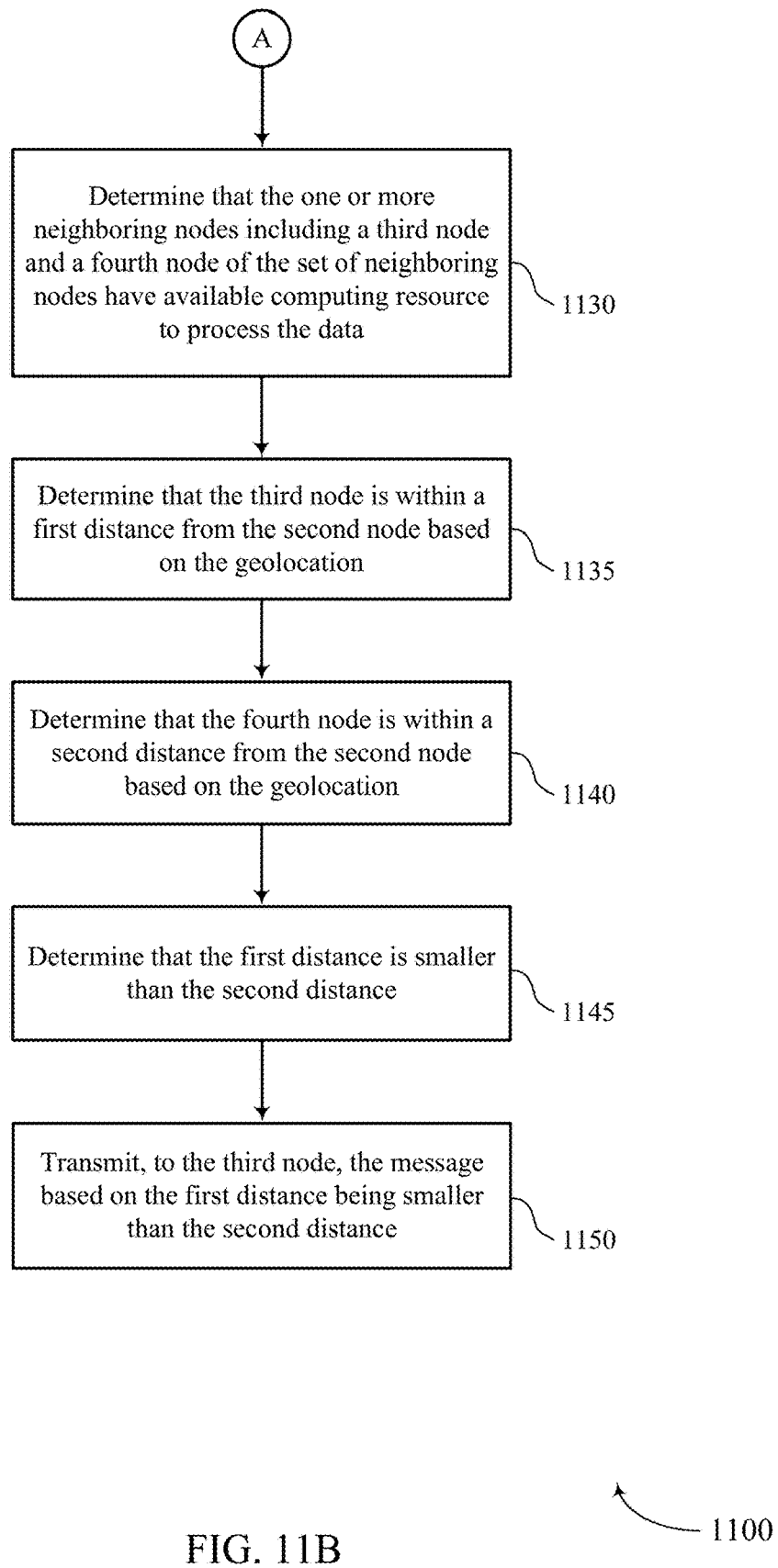

FIGS. 11A and 11B show flowcharts illustrating a method 1100 for distributed data center in accordance with aspects of the present disclosure. The operations of method 1100 may be implemented by a STA 115 or AP 105 or its components as described herein. For example, the operations of method 1100 may be performed by a resource manager as described with reference to FIGS. 5 through 7. In some examples, a STA 115 or AP 105 may execute a set of codes to control the functional elements of the device to perform the functions described below. Additionally or alternatively, the STA 115 or AP 105 may perform aspects of the functions described below using special-purpose hardware.

At 1105 the STA 115 or AP 105 may receive, from a second node of a mesh network, a request for data associated with a security and automation system. The STA 115 or the AP 105 may be a first node of the mesh network. The operations of 1105 may be performed according to the methods described herein. In certain examples, aspects of the operations of 1105 may be performed by a request component as described with reference to FIGS. 5 through 7.

At 1110 the STA 115 or AP 105 may determine that the available computing resources level of the STA 115 or the AP 105 is less than a computing resources level required to process the data. The operations of 1110 may be performed according to the methods described herein. In certain examples, aspects of the operations of 1110 may be performed by a resource component as described with reference to FIGS. 5 through 7.

At 1115 the STA 115 or AP 105 may broadcast a beacon frame or a probe request frame to the plurality of neighboring nodes within the mesh network. The operations of 1115 may be performed according to the methods described herein. In certain examples, aspects of the operations of 1115 may be performed by a broadcasting component as described with reference to FIGS. 5 through 7.

At 1120 the STA 115 or AP 105 may receive a beacon response frame or a probe response frame from one or more neighboring nodes of the plurality of neighboring nodes in the mesh network. The operations of 1120 may be performed according to the methods described herein. In certain examples, aspects of the operations of 1120 may be performed by a broadcasting component as described with reference to FIGS. 5 through 7.

At 1125 the STA 115 or AP 105 may determine a geolocation and available computing resources level of the one or more neighboring nodes based on the received beacon response frame or the received probe response frame. The operations of 1125 may be performed according to the methods described herein. In certain examples, aspects of the operations of 1125 may be performed by a resource component as described with reference to FIGS. 5 through 7.

At 1130 the STA 115 or AP 105 may determine that the one or more neighboring nodes including a third node and a fourth node of the plurality of neighboring nodes have available computing resource to process the data. The operations of 1130 may be performed according to the methods described herein. In certain examples, aspects of the operations of 1130 may be performed by a resource component as described with reference to FIGS. 5 through 7.

At 1135 the STA 115 or AP 105 may determine that the third node is within a first distance from the second node based on the geolocation. The operations of 1135 may be performed according to the methods described herein. In certain examples, aspects of the operations of 1135 may be performed by a resource component as described with reference to FIGS. 5 through 7.

At 1140 the STA 115 or AP 105 may determine that the fourth node is within a second distance from the second node based on the geolocation. The operations of 1140 may be performed according to the methods described herein. In certain examples, aspects of the operations of 1140 may be performed by a resource component as described with reference to FIGS. 5 through 7.

At 1145 the STA 115 or AP 105 may determine that the first distance is smaller than the second distance. The operations of 1145 may be performed according to the methods described herein. In certain examples, aspects of the operations of 1145 may be performed by a resource component as described with reference to FIGS. 5 through 7.

At 1150 the STA 115 or AP 105 may transmit, to the third node, the message based on the first distance being smaller than the second distance. The operations of 1150 may be performed according to the methods described herein. In certain examples, aspects of the operations of 1150 may be performed by a resource component as described with reference to FIGS. 5 through 7.

Figure 12A:
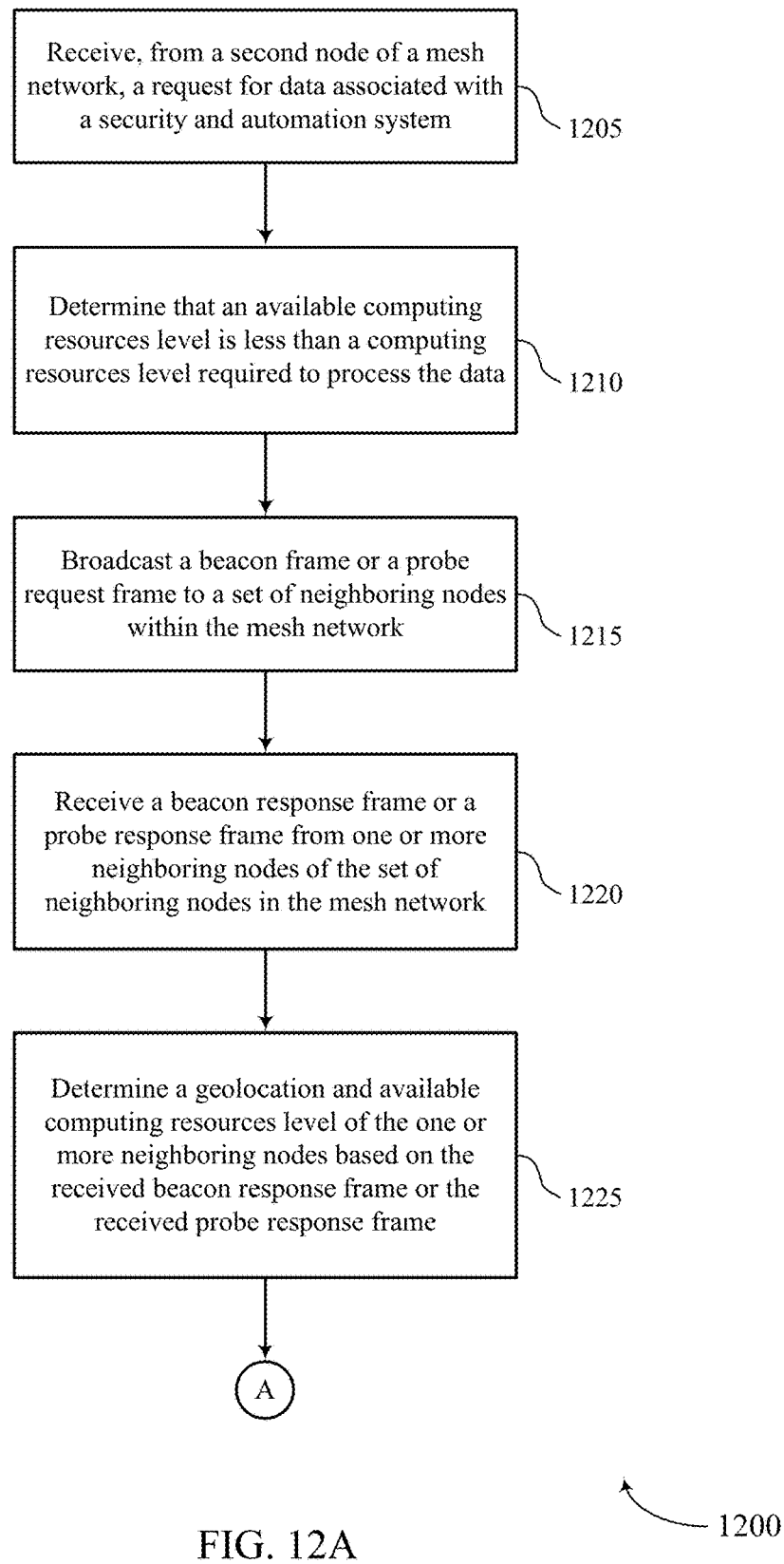
Figure 12B:
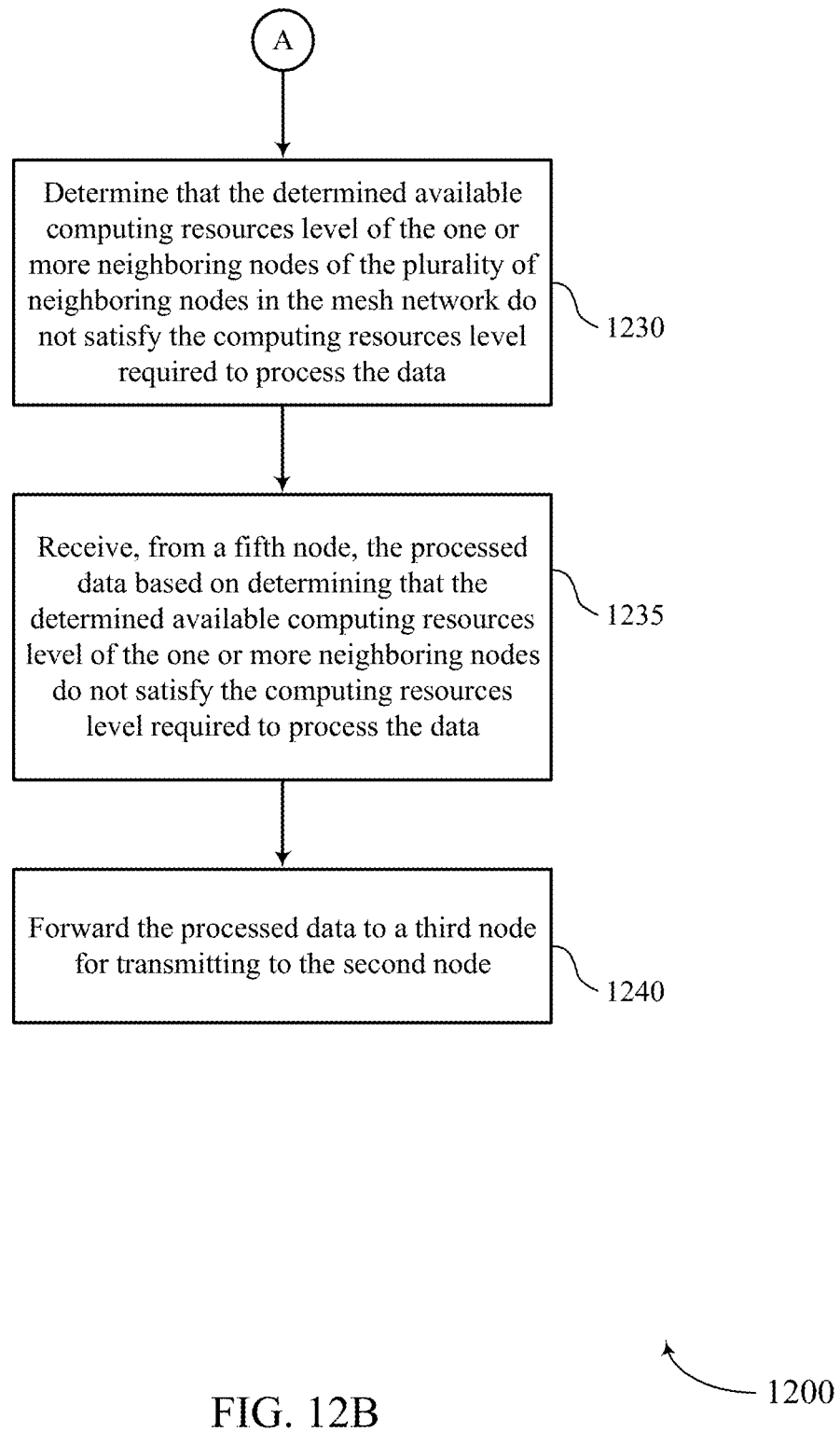

FIGS. 12A and 12B show flowcharts illustrating a method 1200 for a distributed data center in accordance with aspects of the present disclosure. The operations of method 1200 may be implemented by a STA 115 or AP 105 or its components as described herein. For example, the operations of method 1200 may be performed by a resource manager as described with reference to FIGS. 5 through 7. In some examples, a STA 115 or AP 105 may execute a set of codes to control the functional elements of the device to perform the functions described below. Additionally or alternatively, the STA 115 or AP 105 may perform aspects of the functions described below using special-purpose hardware.

At 1205 the STA 115 or AP 105 may receive, from a second node of a mesh network, a request for data associated with a security and automation system. In some examples, the STA 115 or the AP 105 may be a first node of the mesh network. The operations of 1205 may be performed according to the methods described herein. In certain examples, aspects of the operations of 1205 may be performed by a request component as described with reference to FIGS. 5 through 7.

At 1210 the STA 115 or AP 105 may determine that the available computing resources level of the STA 115 or the AP 105 is less than a computing resources level required to process the data. The operations of 1210 may be performed according to the methods described herein. In certain examples, aspects of the operations of 1210 may be performed by a resource component as described with reference to FIGS. 5 through 7.

At 1215 the STA 115 or AP 105 may broadcast a beacon frame or a probe request frame to the plurality of neighboring nodes within the mesh network. The operations of 1215 may be performed according to the methods described herein. In certain examples, aspects of the operations of 1215 may be performed by a broadcasting component as described with reference to FIGS. 5 through 7.

At 1220 the STA 115 or AP 105 may receive a beacon response frame or a probe response frame from one or more neighboring nodes of the plurality of neighboring nodes in the mesh network. The operations of 1220 may be performed according to the methods described herein. In certain examples, aspects of the operations of 1220 may be performed by a broadcasting component as described with reference to FIGS. 5 through 7.

At 1225 the STA 115 or AP 105 may determine a geolocation and available computing resources level of the one or more neighboring nodes based on the received beacon response frame or the received probe response frame. The operations of 1225 may be performed according to the methods described herein. In certain examples, aspects of the operations of 1225 may be performed by a resource component as described with reference to FIGS. 5 through 7.

At 1230 the STA 115 or AP 105 may determine that the determined available computing resources level of the one or more neighboring nodes of the plurality of neighboring nodes in the mesh network do not satisfy the computing resources level required to process the data. The operations of 1230 may be performed according to the methods described herein. In certain examples, aspects of the operations of 1230 may be performed by a resource component as described with reference to FIGS. 5 through 7.

At 1235 the STA 115 or AP 105 may receive, from a fifth node, the processed data based on determining that the determined available computing resources level of the one or more neighboring nodes do not satisfy the computing resources level required to process the data. In some cases, the fifth node may be a remote data center. The fifth node may in some examples be associated and part of a different mesh network than the mesh network associated with the STA 115 or the AP 105. The operations of 1235 may be performed according to the methods described herein. In certain examples, aspects of the operations of 1235 may be performed by a resource component as described with reference to FIGS. 5 through 7.

At 1240 the STA 115 or AP 105 may forward the processed data to a third node for transmitting to the second node. For example, forwarding the processed data to the third node may be associated with a shortest path (e.g., a minimum number of hops, a minimum transmission range) compared to transmitting the processed data from the STA 115 or the AP 105 directly to the second node. To compute the shortest path, the STA 115 or the AP 105 may use shortest path tree (SPT) or a minimum cost tree (MCT) techniques. The operations of 1240 may be performed according to the methods described herein. In certain examples, aspects of the operations of 1240 may be performed by a forwarding component as described with reference to FIGS. 5 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a first node of a mesh network from a second node, a request for data associated with a security and automation system;
determining, at the first node, that a third node associated with a plurality of neighboring nodes within the mesh network has an available computing resources level to process the data based at least in part on configuration information of the mesh network;
determining, at the first node, that the available computing resources level of the first node is less than a computing resources level required to process the data;
broadcasting, by the first node, a beacon frame or a probe request frame to the plurality of neighboring nodes within the mesh network;
receiving, at the first node, a beacon response frame or a probe response frame from one or more neighboring nodes of the plurality of neighboring nodes in the mesh network;
determining, at the first node, a geolocation and available computing resources level of the one or more neighboring nodes based at least in part on the received beacon response frame or the received probe response frame;
determining, at the first node, that the one or more neighboring nodes comprises the third node and a fourth node of the plurality of neighboring nodes have available computing resource to process the data;
determining that the third node is within a first distance from the second node based at least in part on the geolocation;
determining that the fourth node is within a second distance from the second node based at least in part on the geolocation;
determining that the first distance is smaller than the second distance; and
transmitting, from the first node to the third node, a message instructing the third node to process the data based at least in part on determining that the first distance is smaller than the second distance.

2. The method of claim 1, further comprising:
  determining, at the first node, that the third node is within a threshold distance of the second node based at least in part on the configuration information,
  wherein transmitting the message is based at least in part on determining that the third node is within the threshold distance.

3. The method of claim 1, wherein the configuration information comprises at least one of a mesh network identifier (ID), a mesh network topology, a mesh neighbor list, resource information, or a combination thereof.

4. The method of claim 3, wherein the resource information comprises a computing resource availability, a storage resource availability, or both.

5. The method of claim 1, further comprising:
  determining, at the first node, a source address associated with the requested data based at least in part on the received request; and
  determining, at the first node, that the third node is associated with the source address based at least in part on the configuration information,
  wherein transmitting the message to the third node is further based at least in part on determining that the third node is associated with the source address.

6. The method of claim 1, further comprising:
  determining, at the first node, a source address associated with the requested data based at least in part on the received request;
  determining, at the first node, that the first node is associated with the source address based at least in part on the configuration information; and
  determining, at the first node, that the available computing resources level of the first node is less than a computing resources level required to process the data,
  wherein transmitting the message instructing the third node to process the data is further based at least in part on the available computing resources level of the first node being less than the computing resources level required to process the data.

7. The method of claim 1, further comprising:
  determining, at the first node, that the determined available computing resources level of the one or more neighboring nodes of the plurality of neighboring nodes in the mesh network do not satisfy the computing resources level required to process the data;
  receiving, at the first node from a fifth node, the processed data based at least in part on determining that the identified available computing resources level of the one or more neighboring nodes do not satisfy the computing resources level required to process the data; and
  forwarding the processed data from the first node to the third node for transmitting to the second node.

8. The method of claim 7, wherein the fifth node is a node in a second mesh network different from the mesh network.

9. The method of claim 1, further comprising:
  determining routing information based at least in part on the configuration information; and
  encoding the routing information with a portion of the message.

10. The method of claim 1, wherein receiving the request for data from the second node is based at least in part on a first radio access technology (RAT) connection established between the first node and the second node.

11. The method of claim 10, wherein transmitting the message is based at least in part on a second RAT connection established between the first node and the third node.

12. An apparatus for wireless communication, comprising:
  a processor;
  memory in electronic communication with the processor; and
  instructions stored in the memory and executable by the processor to cause the apparatus to:
  receive, at the apparatus of a mesh network from a second apparatus, a request for data associated with a security and automation system;
  determine, at the apparatus, that a third apparatus associated with a plurality of neighboring apparatuses within the mesh network has an available computing resources level to process the data based at least in part on configuration information of the mesh network;
  determine, at the apparatus, that the available computing resources level of the apparatus is less than a computing resources level required to process the data;
  broadcast, by the apparatus, a beacon frame or a probe request frame to the plurality of neighboring apparatuses within the mesh network;
  receive, at the apparatus, a beacon response frame or a probe response frame from one or more neighboring apparatuses of the plurality of neighboring apparatuses in the mesh network;
  determine, at the apparatus, a geolocation and available computing resources level of the one or more neighboring apparatuses based at least in part on the received beacon response frame or the received probe response frame;
  determine, at the apparatus, that the one or more neighboring apparatuses comprises the third apparatus and a fourth apparatus of the plurality of neighboring apparatuses have available computing resource to process the data;
  determine that the third apparatus is within a first distance from the second apparatus based at least in part on the geolocation;
  determine that the fourth apparatus is within a second distance from the second apparatus based at least in part on the geolocation;
  determine that the first distance is smaller than the second distance; and
  transmit, from the apparatus to the third apparatus, a message instructing the third apparatus to process the data based at least in part on determining that the first distance is smaller than the second distance.

13. The apparatus of claim 12, wherein the instructions are further executable by the processor to cause the apparatus to:
  determine, at the apparatus, that the third apparatus is within a threshold distance of the second apparatus based at least in part on the configuration information,
  wherein transmitting the message is based at least in part on determining that the third apparatus is within the threshold distance.

14. The apparatus of claim 12, wherein the configuration information comprises at least one of a mesh network identifier (ID), a mesh network topology, a mesh neighbor list, resource information, or a combination thereof.

15. The apparatus of claim 14, wherein the resource information comprises a computing resource availability, a storage resource availability, or both.

16. The apparatus of claim 12, wherein the instructions are further executable by the processor to cause the apparatus to:

determine, at the apparatus, a source address associated with the requested data based at least in part on the received request; and determine, at the apparatus, that the third apparatus is associated with the source address based at least in part on the configuration information, wherein transmitting the message to the third node is further based at least in part on determining that the third apparatus is associated with the source address.

17. A non-transitory computer-readable medium storing code for wireless communication, the code comprising instructions executable by a processor to:

receive, at a first node of a mesh network from a second node, a request for data associated with a security and automation system;

determine, at the first node, that a third node associated with a plurality of neighboring nodes within the mesh network has an available computing resources level to process the data based at least in part on configuration information of the mesh network;

determine, at the first node, that the available computing resources level of the first node is less than a computing resources level required to process the data;

broadcast, by the first node, a beacon frame or a probe request frame to the plurality of neighboring nodes within the mesh network;

receive, at the first node, a beacon response frame or a probe response frame from one or more neighboring nodes of the plurality of neighboring nodes in the mesh network;

determine, at the first node, a geolocation and available computing resources level of the one or more neighboring nodes based at least in part on the received beacon response frame or the received probe response frame;

determine, at the first node, that the one or more neighboring nodes comprises the third node and a fourth node of the plurality of neighboring nodes have available computing resource to process the data;

determine that the third node is within a first distance from the second node based at least in part on the geolocation;

determine that the fourth node is within a second distance from the second node based at least in part on the geolocation;

determine that the first distance is smaller than the second distance; and transmit, from the first node to the third node, a message instructing the third node to process the data based at least in part on determining that the first distance is smaller than the second distance.

18. The non-transitory computer-readable medium of claim 17, wherein the instructions are further executable by the processor to:

determine, at the first node, that the third node is within a threshold distance of the second node based at least in part on the configuration information, wherein transmitting the message is based at least in part on determining that the third node is within the threshold distance.

* * * * *